(12) United States Patent
Mori

(10) Patent No.: US 7,043,603 B2
(45) Date of Patent: May 9, 2006

(54) STORAGE DEVICE CONTROL UNIT AND METHOD OF CONTROLLING THE SAME

(75) Inventor: Kenji Mori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 10/767,433

(22) Filed: Jan. 30, 2004

(65) Prior Publication Data

US 2005/0076177 A1 Apr. 7, 2005

(30) Foreign Application Priority Data

Oct. 7, 2003 (JP) ......................................... 2003-348063

(51) Int. Cl.
G06F 13/14 (2006.01)

(52) U.S. Cl. ....................................................... 711/113

(58) Field of Classification Search ................. 711/112, 711/113, 114, 118, 119
See application file for complete search history.

(56) References Cited

U.S. PATENT DOCUMENTS

| | | | |
|---|---|---|---|
| 5,475,859 A | | 12/1995 | Kamabayashi et al. |
| 5,689,728 A | * | 11/1997 | Sugimoto et al. ............. 710/38 |
| 6,038,641 A | | 3/2000 | Zangenehpour |
| 6,275,897 B1 | | 8/2001 | Bachmat |
| 6,314,491 B1 | | 11/2001 | Freerksen |
| 6,385,681 B1 | * | 5/2002 | Fujimoto et al. ........... 710/316 |
| 6,470,419 B1 | | 10/2002 | Take et al. |
| 6,647,461 B1 | * | 11/2003 | Fujimoto et al. ........... 711/114 |

(Continued)

FOREIGN PATENT DOCUMENTS

| | | |
|---|---|---|
| EP | 0 671 691 A2 | 2/1995 |
| EP | 0 800 137 A1 | 3/1997 |
| EP | 0 845 738 A2 | 11/1997 |
| GB | 2 271 653 A | 10/1993 |
| GB | 2 366 424 A | 3/2001 |
| JP | 2000-99281 | 9/1998 |

OTHER PUBLICATIONS

United Kingdom Search Report dated Aug. 6, 2004.
English translation of French Search Report mailed Oct. 25, 2004.
Luiz André Barroso, Lourosh Gharachorloo, Robert McNamara, Andreas Nowatzyk, Sbaz Qadeer, Barton Sano, Scott Smith, Robert Stets and Ben Verghese, "Piranha: A Scalable Architecture Based on Single-Chip Multiprocessing," Proceedings of the 27$^{th}$ International Symposium on Computer Architecture, Jun. 13–14, 2000, pp. 282–293.
Ken Wood, "Built to Scale: The Hitachi Freedom Storage™ Lightning 9900™ Series," Hitachi Data Systems–Enterprise Storage, Oct. 2000, pp. 1–18.

*Primary Examiner*—Kevin L. Ellis
(74) *Attorney, Agent, or Firm*—Reed Smith LLP; Stanley P. Fisher, Esq.; Juan Carlos A. Marquez, Esq.

(57) ABSTRACT

A storage device control unit for performing data writing/reading to/from a storage device responding to requests coming from an information processor. The storage device control unit includes: a communications interface section for carrying out communications with the information processor; a storage device interface section for carrying out communications with the storage device; a cache memory section including first memory for storage of data coming and going between the information processor and the storage device; and a connection section for connecting all together the communications interface section, the storage device interface section, and the cache memory section for communications thereamong. The connection section is provided with second memory for storage of data same as the one stored in the first memory. With such a structure, the inner process of the storage device control unit can be effective.

15 Claims, 17 Drawing Sheets

U.S. PATENT DOCUMENTS

| | | |
|---|---|---|
| 6,751,703 B1 * | 6/2004 | Chilton .................. 711/113 |
| 6,813,655 B1 * | 11/2004 | Hosoya et al. ............. 710/36 |
| 2001/0011325 A1 | 8/2001 | Day, III et al. |
| 2001/0049773 A1 | 12/2001 | Bhavsar |
| 2002/0078299 A1 | 6/2002 | Chiou et al. |
| 2003/0188104 A1 | 10/2003 | Sullivan |
| 2004/0019740 A1 | 1/2004 | Nakayama et al. |
| 2004/0059870 A1 | 3/2004 | Ash et al. |
| 2004/0083338 A1 | 4/2004 | Moriwaki et al. |

* cited by examiner

FIG.4

| HEADER SECTION(11) | DATA SECTION(12) |
|---|---|

10

| BROAD CLASSIFICATION | LESS-BROAD CLASSIFICATION | DETAILS |
|---|---|---|
| HEADER SECTION | ADDRESSER ID | ID OF ADDRESSER IF SECTION |
| | ADDRESSEE ID | ID OF ADDRESSEE IF SECTION (e.g., 64 IF SECTIONS: 0~63(EACH IF SECTION), 128(EVERY IF SECTION), 255(MEMORY SECTION)) |
| | COMMUNICATIONS ATTRIBUTE | DATA TYPE(CONTROL DATA OR DATA) |
| | | ACCESS/NO ACCESS TO MEMORY IN SWITCH |
| | | ACCESS/NO ACCESS TO MEMORY IN MEMORY CONTROL SECTION |
| | | TARGET NODE(ENTIRE MPU COMMUNICATIONS, SPECIFIC MPU COMMUNICATIONS, CACHE MEMORY COMMUNICATIONS) |
| | | PRIORITY INFORMATION |
| | ACCESS ADDRESS | ACCESSING ADDRESS e.g., MEMORY |
| | DATA LENGTH | ACCESSING DATA LENGTH |
| DATA SECTION | DATA/CONTROL DATA | ACTUAL DATA/CONTROL DATA |
| | CHECK CODE | DATA PROTECTION CODE |

STORAGE DEVICE CONTROL UNIT AND METHOD OF CONTROLLING THE SAME

CROSS REFERENCES TO RELATED APPLICATION

This application relates to and claims priority from Japanese Patent Application No. 2003-34063 filed on Oct. 7,2003, the entire disclosure of which is incorporated

BACKGROUND OF THE INVENTION

1. Field of the Invention

The present invention relates to a storage device control unit and a control method therefor.

2. Description of the Related Art

Known as a storage device control unit is of a type performing data writing/reading to/from a storage device responding to requests coming from an information processor (as an example, refer to Patent Document 1 in the below). Such a storage device control unit has been widely popular in various fields served by information processors, i.e., information processing services.

[Patent Document 1] JP-A-2000-99281

SUMMARY OF THE INVENTION

Between information processors and storage device control units, a data transfer speed required therebetween is increasing year by year. To follow such an increase of the data transfer speed, the storage device units are expected to have a mechanism for achieving effective internal processing. With such a mechanism, a response time can be shortened for requests coming from the information processors, and what is better, throughput improvement will be anticipated throughout the unit.

In consideration thereof, an object of the present invention is to provide a storage device control unit and a control method therefor.

To attain the object above, the present invention is mainly directed to a storage device control unit for performing data writing/reading to/from a storage device responding to requests coming from an information processor. The unit is so structured as to include: a communications interface section for carrying out communications with the information processor; a storage device interface section for carrying out communications with the storage device; a cache memory section provided with first memory for storage of data coming and going between the information processor and the storage device; and a connection section for connecting all together the communications interface section, the storage device interface section, and the cache memory section for communications thereamong. The connection section is provided with second memory for storage of data same as the one stored in the first memory.

According to the present invention, to the connection section connecting all together the communications interface section, the storage device interface section, and the cache memory section for communications thereamong, the second memory is provided for storage of data same as the one stored in the first memory of the cache memory section.

Assuming here is a case where the communications interface section or the storage device interface section (hereinafter, these are collectively referred to as interface section) makes access to the first memory of the cache memory section for the data and others therein. In this case, if the accessing data is located in the second memory of the connection section, the connection section can forward the data in the second memory back to the interface section. That is, the second memory of the connection section functions as a cache when the interface section makes access to the first memory.

According to the present invention, the traffic can be reduced between the connection section and the cache memory section. Further, the access time can be shortened for the interface section to make access to the first memory for data and others stored therein. This is because, as already described, the connection section makes no access to the cache memory section responding to the interface section making access to the second memory for data and others therein. As a result, the throughput improvement is expected throughout the unit.

According to the present invention, a storage device control unit and a control method therefor can be successfully provided.

BRIEF DESCRIPTION OF THE DRAWINGS

FIG. 4 is a diagram illustrating the packet structure of the present embodiment;

DESCRIPTION OF THE PREFERRED EMBODIMENT

Figure 1:
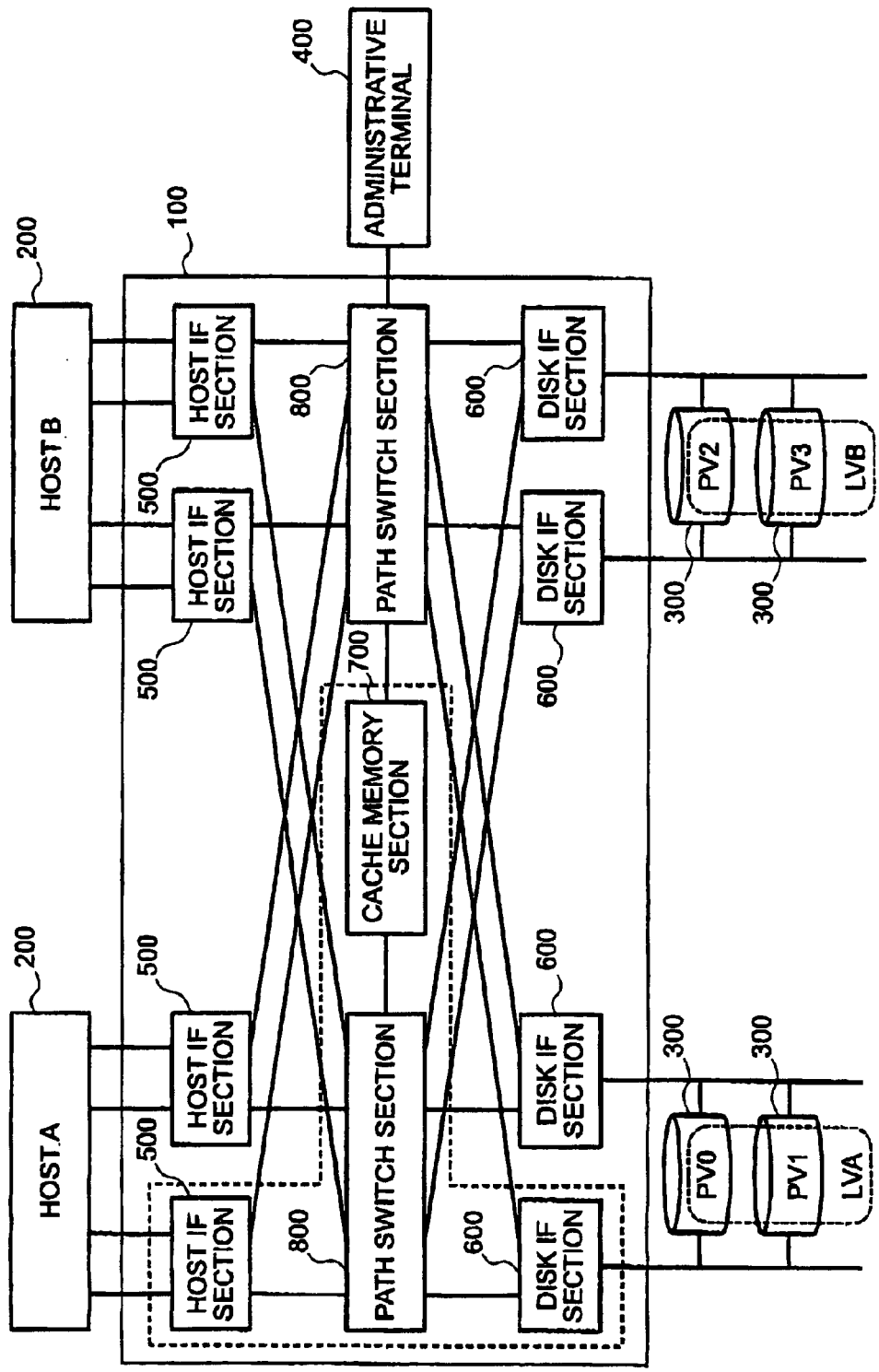
FIG. 1 is a block diagram showing the entire structure of a storage system of an embodiment.

Entire Structure of Storage System:

FIG. 1 is a block diagram showing the entire structure of a storage system of the present embodiment. The storage system is structured by a storage device control unit 100, host computers ("information processors") 200, and storage devices 300.

The storage device control unit 100 controls over the storage system. Specifically, the storage device control unit 100 is connected to the host computers 200 for receiving "data" reading/writing requests coming from the host computers 200. Also connected are a plurality of storage devices 300, and responding to "data" input/output requests from the host computers 200, "data" writing/reading is performed with respect to the storage volumes being resources of the storage devices 300.

Herein, the storage volume denotes a storage resource including both a physical volume and a logical volume. The physical volume is a physical storage region provided by the storage device 300 (in FIG. 1, PV0 to PV3), and the logical volume is a storage region logically set on the physical volume (in FIG. 1, LVA and LVB).

Between the storage device control unit 100 and the host computers 200, communications is carried out in accordance with a high-speed communications protocol. Exemplified for such a protocol are Fibre Channel, SCSI (Small Computer System Interface), FICON™(Fibre Connection), ESCON™(Enterprise System Connection), ACONARC™ (Advanced Connection Architecture), FIBARC™(Fibre Connection Architecture), and TCP/IP (Transmission Control Protocol/Internet Protocol).

Alternatively, the above-described communications protocols may be used together for communications between the storage device control unit 100 and the host computers 200. For example, Fibre Channel may be used for communications with a host A (200), and TCP/IP may be used for communications with a host B (200). When the host computer 200 is a main frame computer, usage possibilities are FICON, ESCON, ACONARC, and FIBARC. When the host computer 200 is an open computer, usage possibilities are Fibre Channel, SCSI, and TCP/IP.

Note herein that the "data" reading/writing request from the host computer 200 may be made on a block basis being a "data" management unit in the storage volume, or on a file basis through file name designation. In the latter case, the storage device control unit 100 functions as NAS (Network Attached Storage) realizing file level access from the host computer 200.

The host computer 200 is a computer providing various information processing services to a client computer (not shown). The information processing services provided as such are, for example, online services and batch processing services. The online services include bank Automatic Teller Machine (ATM) services and the Internet browsing services, and the batch processing services include experimental simulations in scientific and technological fields. Here, bus provision is doubly made between the host computer 200 and the storage device control unit 100. Thus, even if bus failure occurs to one bus, the other bus can continuously receive input/output requests.

The storage device 300 is the one provided to supply any storage resource including the physical volume and the logical volume to the storage system. Devices applicable thereto may be hard disk drives (disk drives), semiconductor storage devices, and others. In the below, the storage device 300 is assumed as being a disk drive.

An administrative terminal 400 is a computer in charge of maintenance control over the storage system. For example, the administrative terminal 400 can perform logical volume setting onto the storage device 300, installation of programs to be executed by an MPU 520 of a host IF section 500 or an MPU 620 of a disk IF section 600. Herein, the administrative terminal 400 may be incorporated into the storage system, or may be placed at a distant location and connected to the storage system over the communications network. If this is the case, the administrative terminal 400 receives update programs from other computers over the communications network, and installs those to the host IF section 500 or the disk IF section 600 as appropriate.

Figure 2:
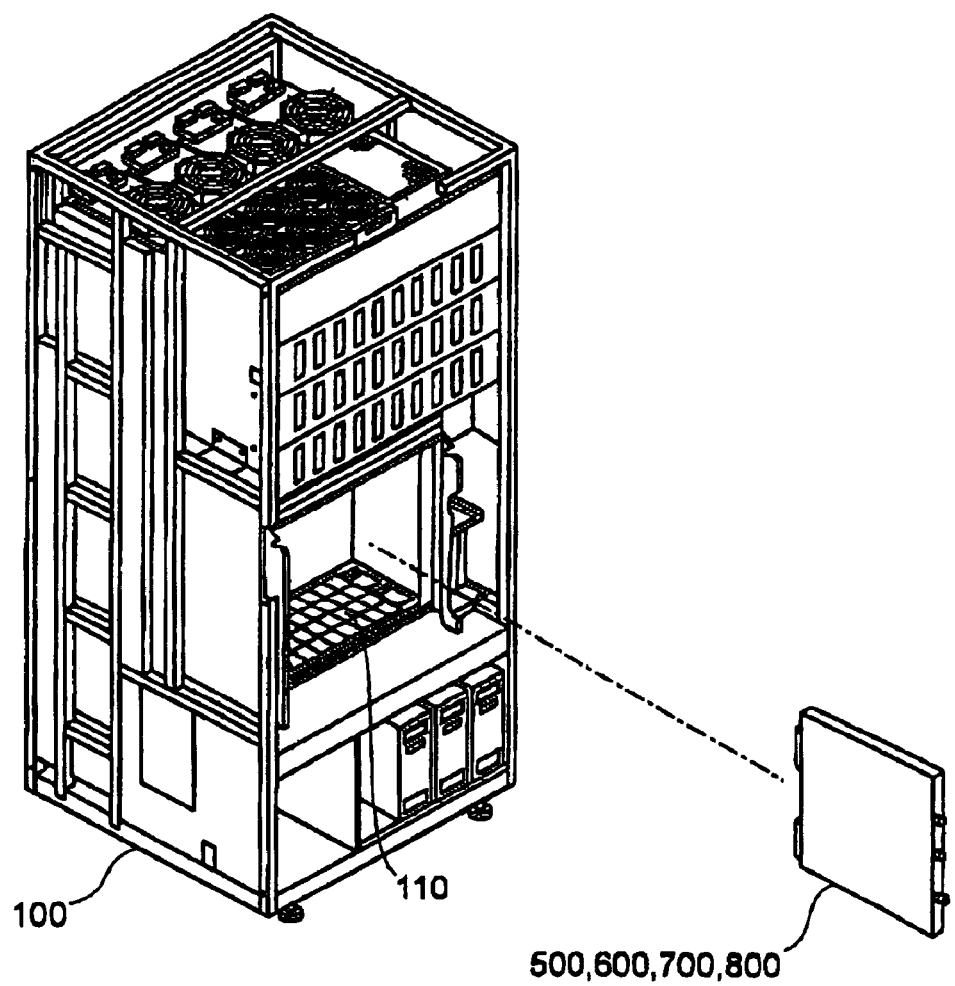
FIG. 2 is a diagram showing the outer structure of a storage device control unit of the present embodiment.

Outer Appearance of Storage Device Control Unit:

The storage device control unit 100 is in a box shape as shown in FIG. 2, and includes a unit attachment section 110. To this unit attachment section 110, attached are: a channel control unit being the host IF section 500, a disk control unit being the disk IF section 600, a path switch unit being a path switch section 700, and a cache memory unit being a cache memory section 700. Through attachment of such units (channel control unit, disk control unit, path switch unit, and cache memory unit) to the unit attachment section 110 as appropriate for the storage system, the storage system is accordingly controlled. Such units can be realized by hardware formed on a circuit board or firmware to be executed by such hardware.

Structure of Storage Device Control Unit:

A section in FIG. 1 enclosed by broken lines shows the minimum structure required for realizing either the control system or the standby system, both being the systems on the host A (200) side. By referring to FIG. 3, a description is made of the host IF section ("communications interface section") 500, the disk IF section ("storage device interface section") 600, the cache memory section 700, and the path switch section ("connection section") 800, all of which are in the section of FIG. 1 enclosed by the broken lines.

<Host IF Section>

The host IF section 500 is in charge of communications between the host computer (HOST) 200 and the storage device control unit 100. The host IF section 500 is provided with a host IF control section (HCTL) 510, the processor (MPU) 520, local memory (LM) 530, and a memory access control section (MACTL) 540.

The host IF control section 510 is connected to the host computer 200, and depending on the communications protocol with the host computer 200, executes a protocol conversion process to "data" coming and going between the host computer 200 and the storage device control unit 100.

The MPU 520 is in charge of control entirely over data transfer in the host IF section 500. For such control, two modes are available for selection. One is a synchronous mode in which the MPU 520 reads a control program stored in the local memory 530 for execution, and the other is an asynchronous mode in which the memory access control section 540 reads the control program from the local memory 530 for execution irrespective of the operation of the MPU 520.

Figure 3:
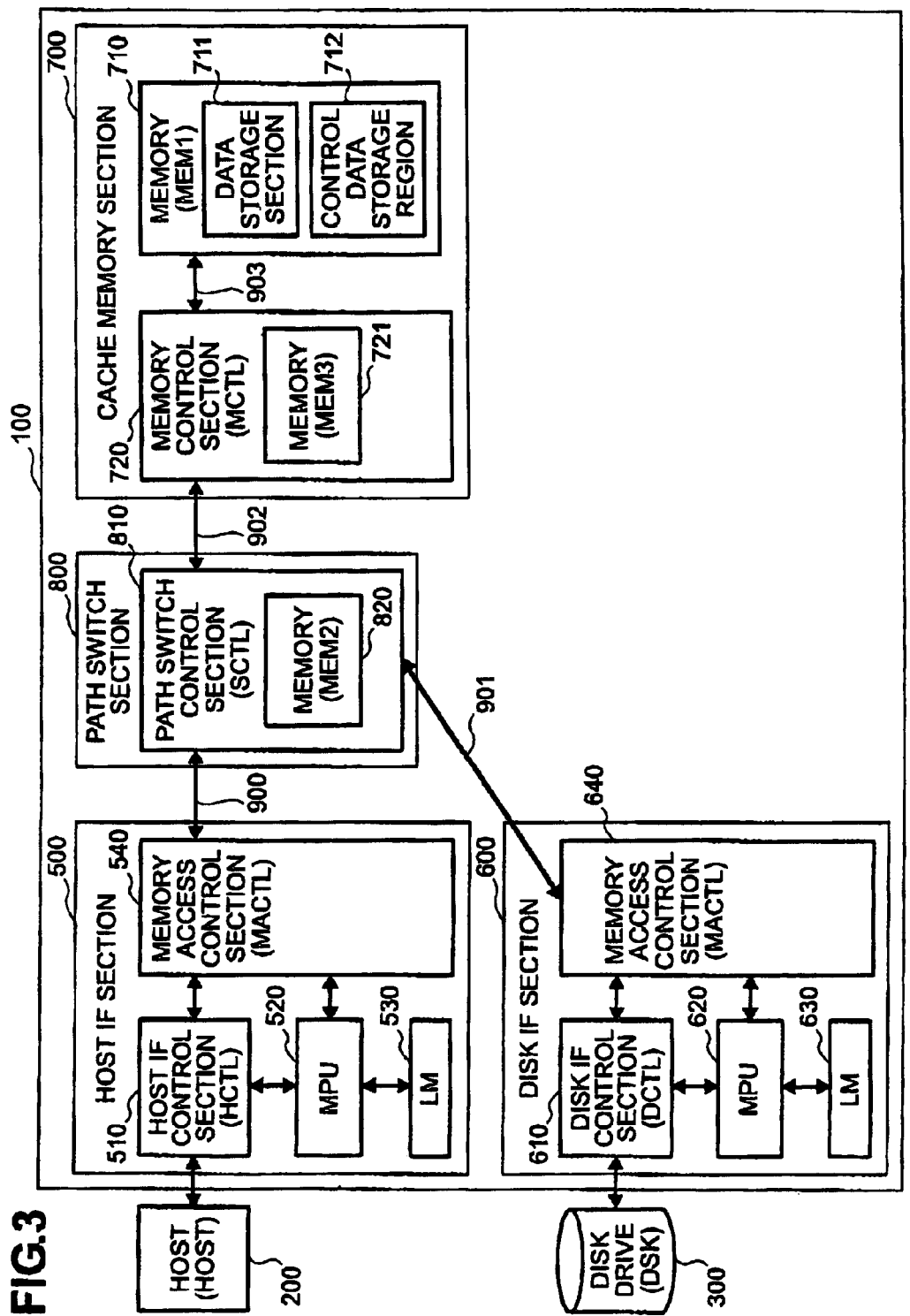
FIG. 3 is a block diagram showing the structure of the storage device control unit of the present embodiment.

Exemplified in FIG. 3 is the structure for the synchronous mode in which the MPU 520 is allowed to directly access the local memory 530. Therein, between the MPU 520 and the local memory 530, a local memory control section (not shown) may be provided. If this is the case, the memory access control section 540 functions as a so-called DMA (Direct Memory Access) controller with which data in the local memory 530 and control commands from the MPU 520 become accessible not via the MPU 520 but via the local memory control section (not shown).

The memory access control section ("access control section") 540 controls data transfer to the internal constituents (i.e., another host IF section 500, disk IF section 600, cache memory section 700) via the path switch section 800. In detail, the memory access control section 540 receives "data" or "control data" from the host IF control section 510, the MPU 520, or the local memory control section (not shown). Based on thus received "data" or "control data", a packet 10 (will be described later) is created for data transfer to the internal constituents. Here, if the packet 10 is received from the cache memory section 700 and others via the path switch section 800, data extraction is accordingly made from this packet 10.

<Disk IF Section>

The disk IF section 600 is in charge of communications between the storage device control section 100 and the storage device 300. The disk IF section 600 is provided with a disk IF control section (DCTL). 610, the processor (MPU) 620, local memory (LM) 630, and a memory access control section (MACTL) 640.

The disk IF control section 610 is connected with the storage device 300, and goes through a protocol conversion process of "data" coming and going between the storage device 300 and the storage device control unit 100. The MPU 620 controls entirely over data transfer in the disk IF section 600. For such control, mode selection is allowed between a synchronous mode and an asynchronous mode as for the host IF section 500.

The memory access control section ("access control section") 640 controls data transfer to the internal constituents (i.e., host IF section 500, another disk IF section 600, cache memory section 700) via the path switch section 800. In detail, the memory access control section 640 receives "data" or "control data" from the disk IF control section 610, the MPU 620, or a local memory control section (not shown) provided between the MPU 620 and the local memory 630. Based on thus received "data " or "control data", the packet 10 (will be described later) is created for data transfer to the internal constituents. Here, if the packet 10 is received from the cache memory section 700 and others via the path switch section 800, data extraction is accordingly made from this packet 10.

<Cache Memory Section>

The cache memory section 700 is provided with memory (MEM1) 710, and a memory control section (MCTL) 720. Herein, the memory control section 720 and the memory 710 are connected to each other via an internal bus 903.

The memory ("first memory") 710 stores both the "data" coming and going between the host computer 200 and the storage device 300, and the "control data" used for controlling data transfer inside of the storage device control unit 100 via an internal bus 900. The memory 710 is exemplified by volatile memory such as SRAM and DRAM, nonvolatile memory such as flash memory and EEPROM, and others.

Note here that the "control data" includes "microprogram", "cache directory information", "JOB management information", "structural information", "failure information", and the like. Specifically, the "microprogram" is the one executed by the MPU 520 of the host IF section 500, and the MPU 620 of the disk IF section 600. The "cache directory information" is the one designating the specific memory (820, 721, or 700) for storage of cache data. The "JOB management information" is the one needed for the host IF section 500 and the disk IF section 600 to operate together for process execution. The "structural information" is the one indicating the internal structure of the storage device control unit 100 such as the number and types of the host IF section 500 and the disk IF section 600, the capacity of the storage device 300, and the capacity of the memory (820, 721, and 700). The "failure information" is the one telling lock-outs, and failure details.

The memory 710 includes address spaces of a storage region for the "data" (hereinafter, referred to as data storage region) 711, and a storage region for the "control data" (hereinafter, control data storage region) 712. It means that the cache memory section 700 solely functions both as a cache memory section and a shared memory section, those of which are separately provided in the conventional storage device control unit. Accordingly, the storage device control unit 100 can be simpler in its internal structure, being advantageous in terms of maintenance.

The memory control section 720 is in charge of access control over the data storage region 711 or the control data storage region 712 both in the address space of the memory 710. Further, the memory control section 720 goes through packet creation from the "data" and others read from the memory 710 when forwarding the "data" and others back to the host IF section 500 or the disk IF section 600 via the path switch section 800. The result is the packet 10, which will be described later.

Inside of the memory control section 720, provided is memory (MEM3) 721 for storage of the same "data" and "control data" as in the memory 710. Here, the memory ("third memory") 721 may be provided on an internal bus 902 between the path switch section 800 and the cache memory section 700 or on another internal bus between the memory control section 720 and the memory 710 as long as being accessible by the memory control section 720.

Here, in the cache memory section 700, the memory 721 can operate as an L1 (Level 1) cache, and the memory 710 as an L2 (Level 2) cache. In this sense, the memory 721 is preferably higher in data transfer speed than the memory 710.

The memory control section 720 is not necessarily included if the memory access control sections 540 and 640 are so structured as to perform data conversion into data formats directly processable by the memory 710. However, including the memory control section 720 and the memory 721 will allow cache hierarchy construction of three-level (in the order of memory 820, 721, and 710) on the communications path from the host IF section 500 or the disk IF section 600 to the memory 710. Such an increase of the depth of the hierarchy from two-level (memory 820 and 710) to three-level (memory 820, 721, and 710) favorably increases the flexibility for determining which memory is to be used for data storage. This eases data arrangement in whichever memory (820, 721, or 710) flexibly depending on the data contents to increase the cache hit ratio of the storage device control unit 100 in its entirety.

<Path Switch Section>

The path switch section 800 includes a path switch control section (SCTL) 810. The path switch control section 810 connects the host IF section 500, the disk IF section 600, and. the cache memory section 700 together for communications thereamong. The path switch control section 810 carries out communications, via the packet 10, between the cache memory section 700, and one host IF section 500 or one disk IF section 600, or between all of the host IF sections 500 and all of the disk IF sections 600. Such communications is carried out based on the communications attributes (will be described below) of the packet 10 received from the memory access control section 540 of the host IF section 500, or the memory access control section 640 of the disk IF section 600. Here, the path switch section 800 is exemplarily a high-speed crossbar switch for establishing a star network connection among the host IF section 500, the disk IF section 600, and the cache memory section 700.

Used for connection between the host IF section 500 and the path switch section 800 is the internal bus 900, between the disk IF section 600 and the path switch section 800 is an internal bus 901, and between the path switch section 800 and the cache memory section 700 is the internal bus 902. The internal buses 900 and 901 are both a data bus used for transfer of the "data" and the "control data". Accordingly, the internal buses 900 to 962 each work both as the internal bus for "data" transfer and the internal bus for "control data"transfer. This provides more room for wiring design than the one in which those two internal buses are independently provided. Thanks thereto, wiring crosstalk and other phenomena can be successfully avoided, thereby allowing data transfer with a high speed. Moreover, data bus expansion is eased following addition of the interface sections and control logic.

Similar to the memory 721, the bus switch control section ("control section") 810 is provided with memory (MEM2) 820 for storage of the same "data" and "control data" as in the memory 710. Here, the memory ("second memory") 820 may be provided. on the internal bus 900 between the host IF section 500 and the path switch section 800, on the internal bus 901 between the disk IF section 600 and the path switch section 800, or on the internal bus 902 between the path switch section 800 and the cache memory section 700 as long as being accessible by the path switch control section 810.

When the host IF section 500 or the disk IF section 600 makes access to the memory 710, the memory 820 can function as a higher-level (hierarchy) cache than the memory 721 or 710. That is, in the storage device control unit 100, the memory 820 can operate as the L1 (Level 1) cache, the memory 721 as the L2 (level 2) cache, and the memory 710 as an L3 (Level 3) cache. If the cache memory section 706 does not include the memory 721, the memory 820 operates as the L1 cache, and the memory 710 as the L2 cache. In view thereof, the memory 820 is preferably higher in data transfer speed than the memory 721 and 710.

As such, it is considered advantageous by the path switch control section 810 of the path switch section 800 including the memory 820. Specifically, when the host IF section 500 or the disk IF section 600 is making access to the memory 710 of the cache memory section 700 for "data" and others therein, if the memory 820 of the path switch section 810 is carrying the accessing data, the path switch section 800 can forward the "data" and others stored in the path switch section 800 or the memory 820 back to the host IF section 500 or the disk IF section 600. This favorably reduces the traffic between the path switch section 800 and the cache memory section 700.

Further, when the host IF section 500 or the disk IF section 600 makes access to the memory 710 for "data" and others therein, the path switch section 800 does not make access to the cache memory section 700 as described in the foregoing. Accordingly, this shortens the access time taken by the host IF section 500 or the disk IF section 600 to make access to the memory 710 for the "data" and others stored therein, successfully leading to the better throughput improvement throughout the unit.

<Packet Format>

By referring to FIG. 4, described is the format of the packet 10 to be created in the memory access control sections 540 and 640.

The packet 10 is structured by adding a header section 11 to a data section 12, which includes the actual "data" or "control data" and a "check code" for error detection or error correction in the packet 10.

The header section 11 is structured by "addresser ID", "addressee ID", "communications attribute", "access/address information", "data length" and others. Specifically, "the addresser ID" is the one allocated to the host IF section 500 or the disk IF section 600 being the addresser of the packet 10, the "addressee ID" is the one allocated to the host IF section 500, the disk IF section 600, or the cache memory section 700 being the destination (node) of the packet 10, the "access/address information" is information about the addressee of the packet 10, and the "data length" is used for access at the addressee of the packet 10.

The "addresser ID" is available for every host IF section 500 and every disk IF section 600. The "communications attribute" includes "data type information", "first access/no access information", "second access/no access information", "node information ("address information"), and "priority information". Specifically, the "data type information" is used for distinguishing whether the packet 10 is for the "data" or the "controldata ". The "first access/no access information" is used for designating whether or not to make access to the memory 820 of the path switch section 800, and the "second access/no access information" is used for designating whether or not to make access to the memory 721 of the memory control section 720. The "node information" is used for designating the cache memory section 700, the specific IF section (500 or 600), or every IF section (500 and 600) as the target node of the packet 10. The "priority information" is used for designating the process priority in the path switch section 800.

Communications Details Handled by Path Switch Section:

Based on the communications attributes of the packet 10 received from the host IF section 500 or the disk IF section 600, the path switch section 800 carries out communications with the cache memory section 700 (hereinafter, referred to as cache memory communications), communications with any specified MPU 520 or 620 (specific MPU communications), or communications with every MPU 520 and 620 (entire MPU communications). In the below, each communications is briefly described with reference to the accompanying drawings.

<Cache Memory Communications>

Figure 5:
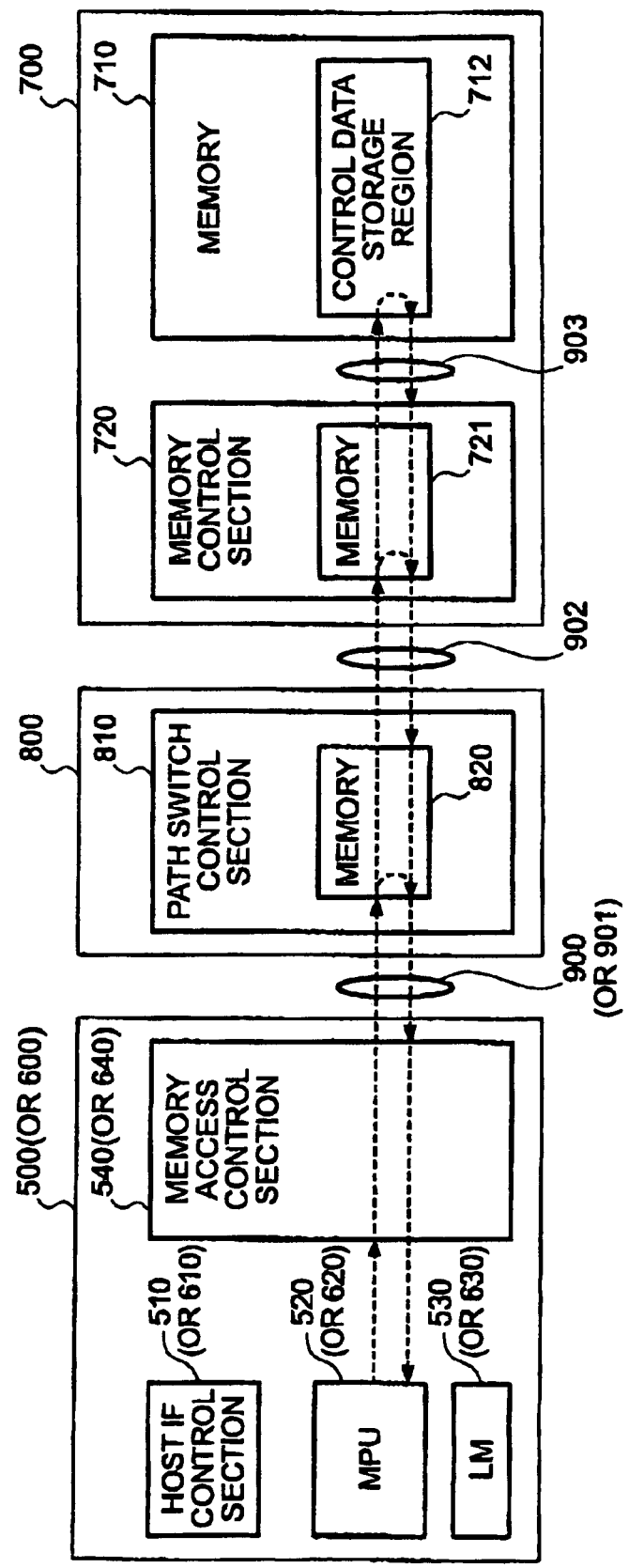
FIG. 5 is a diagram showing how access will be given at the time of cache memory communications of the present embodiment.

The cache memory communications is mainly applied when the MPU 520 or 620 (in the below, referred to as master MPU) of the host IF section 500 or the disk IF section 600 (master IF section) reads out the "control data" such as cache directory information and update programs stored in the memory 710 (control data storage region 712) of the cache memory section 700, or updates the "control data". FIG. 5 is a diagram showing how access will be given at this time.

Figure 6:
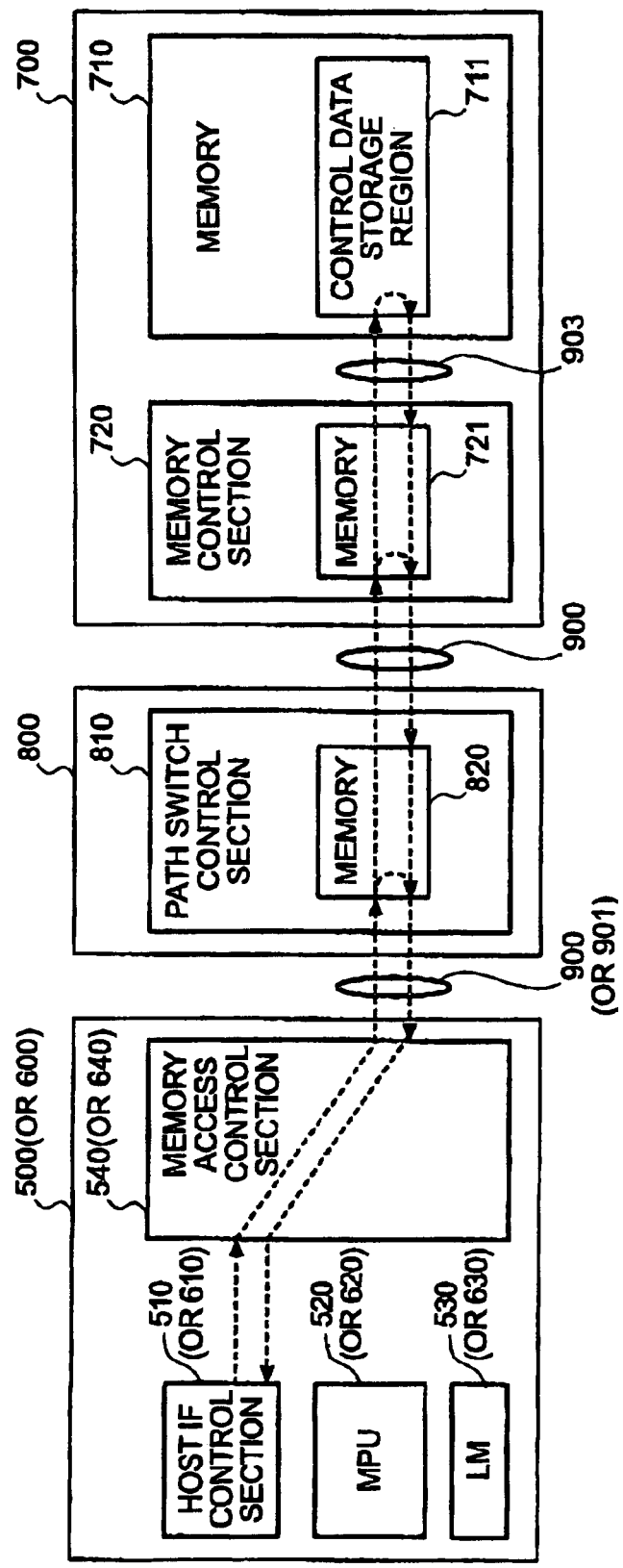
FIG. 6 is a diagram showing how access will be given at the time of cache memory communications of the present embodiment.

The cache memory communications includes a case where the storage device control unit 100 makes access to the memory 710 (data storage region 711) of the cache memory section 700 carrying the same "data" as the storage device 300 responding to a "data" writing/reading request to/from the host computer 200 to the storage device 300. FIG. 6 is a diagram showing how access will be given at this time.

Here, With the cache memory communications, if access is required from the master IF section 500 or 600 to the cache memory section 700 (memory 710), the internal buses 900 to 903 are to be all used. Therefore, increasing the usage efficiency of the internal buses 900 to 903 favorably leads to increase of the access efficiency of the cache memory communications, and moreover, leads to the better throughout of the storage device control unit 100 in its entirety.

In view thereof, the present invention includes the mechanism for increasing the usage efficiency of the internal buses 900 to 903 in various processes (reading process, writing process, and priority process) described below.

<<Reading Process>>

Figure 7:
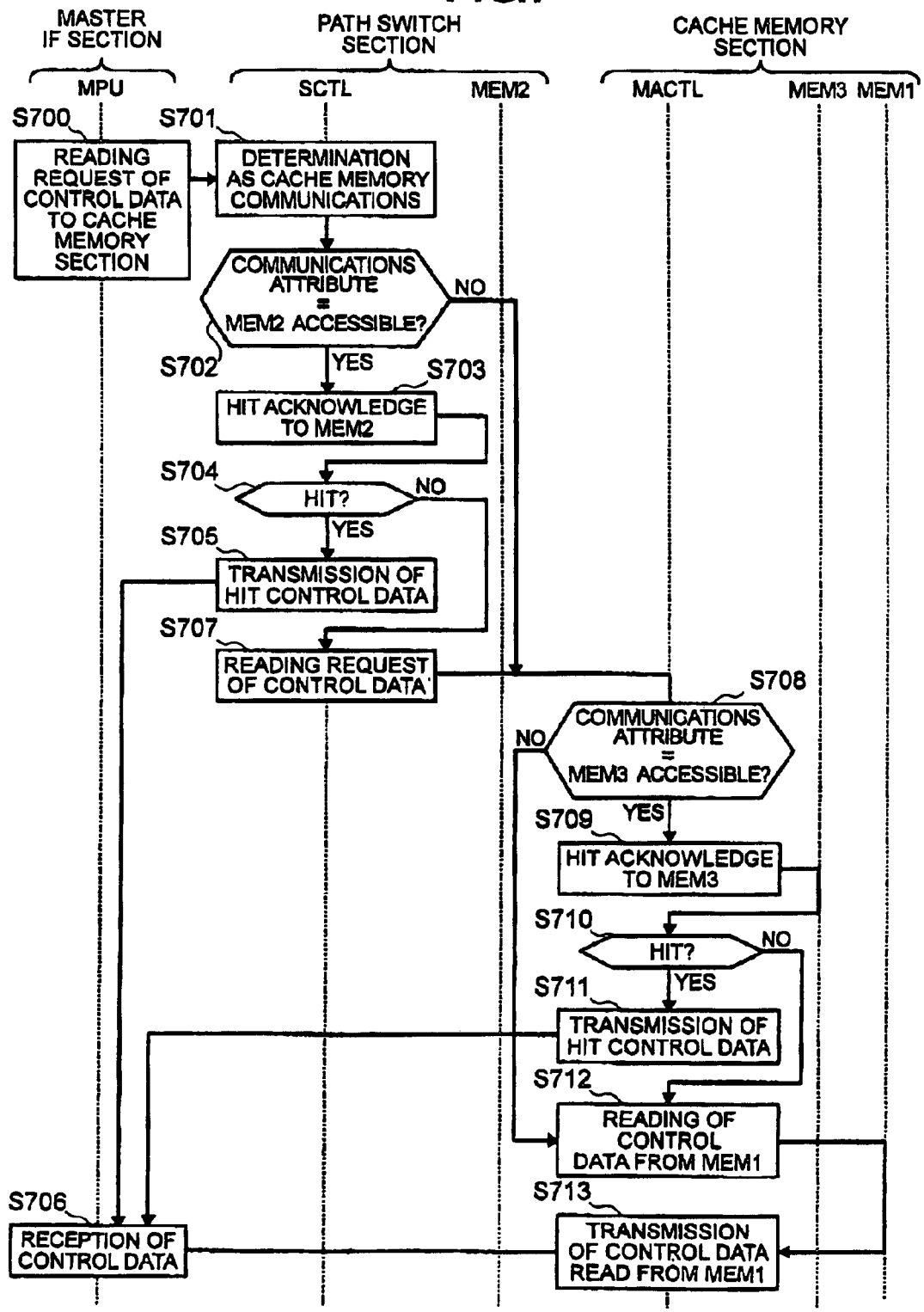
FIG. 7 is a flowchart illustrating a reading process at the time of cache memory communications of the present embodiment.

FIG. 7 is a flowchart illustrating a reading process at the time of cache memory communications. In the below, described is a process to be executed when a request is issued in the master IF section 500 or 600 for reading the "control data" stored in the memory 710 of the cache memory section 700. Here, if issued in the master IF section 500 or 600 is a request for reading the "data" stored in the memory 710 of the cache memory section 700, the process to be executed is the same as the above case. Thus, the description is not given twice.

First, after conversion, into the packet 10, of a request addressed to the cache memory section 700 for reading the "control data" (e.g., cache directory information), the master MPU 520 or 620 of the master IF section 500 or 600 transmits the result to the path switch section 800 via the inner path 900 or 901 (S700). Responding to the reading request received from the master IF section 500 or 600, the path switch control section 810 of the path switch section 800 analyzes the communications attribute of "node information" included in the reading request to determine that the communications is cache memory communications (S701). The path switch control section 810 also analyzes the communications attribute of "first access/no access information" in the received reading request to determine whether or not to make access to the memory 820 of the path switch section 800 (S702).

Here, if determined as making access to the memory 820 (S702: YES), the path switch control section 810 checks whether a cache hit is occurring, i.e., whether the "control data" corresponding to the received reading request is stored or not by reading cache tag information stored in the memory 820, for example (S703). If the cache hit is occurring (S704: YES), the path switch control section 810 returns thus hit "control data" to the master IF section 500 or 600 being the addresser of the reading request via the internal bus 900 or 901 (S705). Then, the master IF section 500 or 600 receives the "control data" from the path switch section 800 (S706).

If determined as making no access to the memory 820 (S702: NO) or if no cache hit is occurring (S704: NO), the path switch control section 810 transmits the reading request received from the master IF section 500 or 600 to the cache memory section 700 via the internal bus 902. The memory control section 720 of the cache memory section 700 then analyzes the communications attribute of "second access/no access information" in thus received reading request to -determine whether or not to make access to the memory 721 in the memory control section 720 (S708).

If determined as making access to the memory 721 (S708: YES), the memory control section 720 checks whether a cache hit is occurring, i.e. ,whether the "control data" corresponding to the received reading request is stored in the memory 721 (S709). If the cache hit is occurring (S710: YES), the memory control section 720 returns thus hit "controldata+ to the master IF section 500 or 600 via the internal bus 902, the path switch section 800, and the internal bus 900 or 901 (S711).

If determined as making no access to the memory 721 (S708: NO) or if no cache hit is occurring (S710: NO), the memory control section 720 reads the "control data" corresponding to thus received reading request from the memory 710 (control data storage region 712) (S712). Then, the resulting "control data" is returned to the master IF section 500 or 600 via the memory control section 720, the internal bus 902, the path switch section 800, and the internal bus 900 or 901 (S713).

As such, when the master IF section. 500 or 600 is making access to the memory 710 of the cache memory section 700 for the "data" or "control data" stored therein, the path switch section 800 can return such data to the master IF section 500 or 600 if it is found in the memory 820 of the path switch section 810. This favorably reduces the traffic on the internal buses 902 and 903 between the path switch section 800 and the cache memory section 700.

The accessing "data" or "control data" is not necessarily in the memory 820 of the path switch section 810, but may be in the memory 721 of the memory control section 720 for the memory control section 720 to return the "data" or "control data" stored in the memory 721 to the master IF section 500 or 600. This successfully reduces the traffic on the internal bus 903 between the memory control section 720 and the memory 710.

As is known from the above, according to the present invention, the internal buses 900 to 903 can be increased in their usage efficiency, leading to the better throughput throughout the storage device control unit 100.

<<Writing process>>

Figure 8:
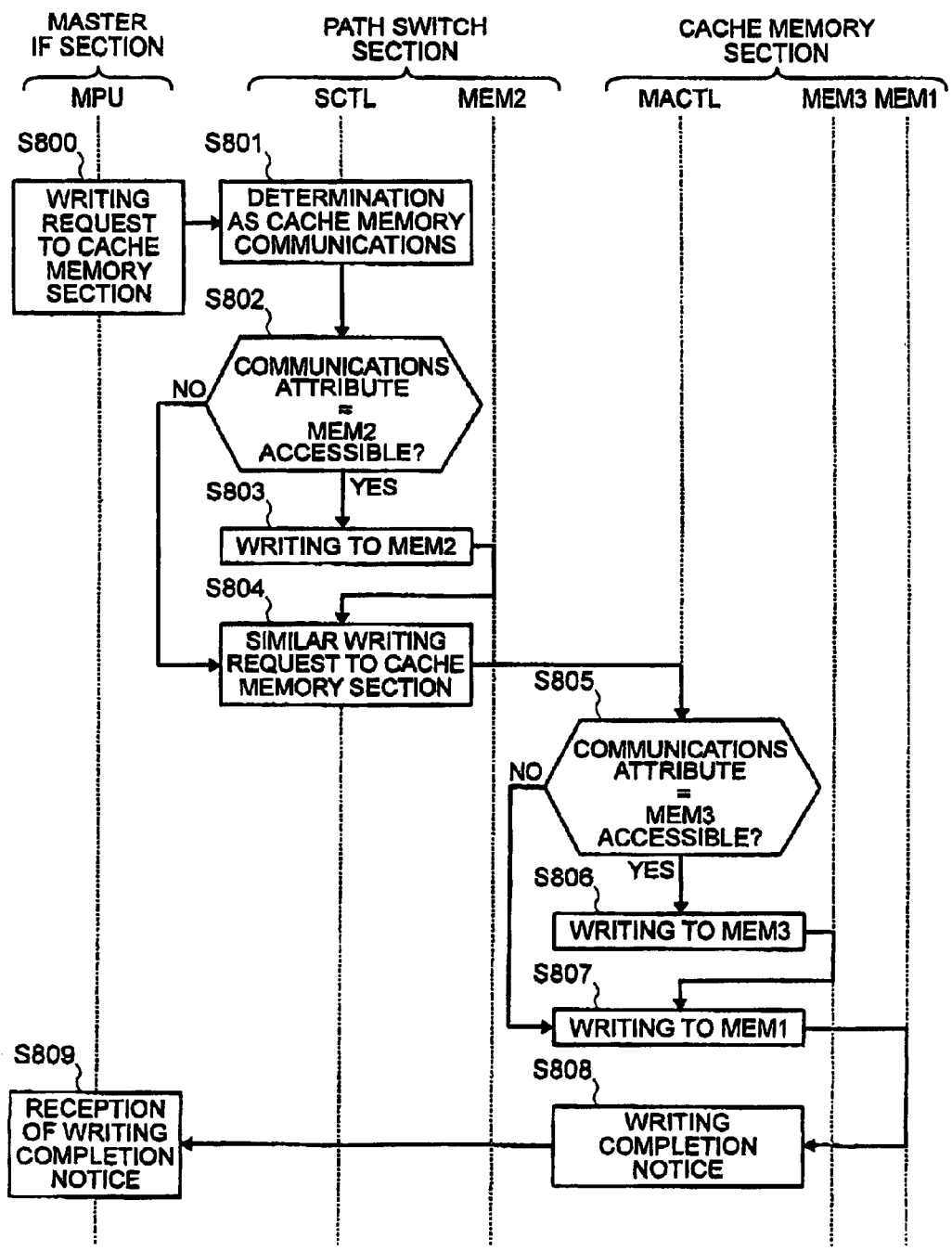
FIG. 8 is a flowchart illustrating a writing process at the time of cache memory communications of the present embodiment.

FIG. 8 is a flowchart illustrating a writing process at the time of cache memory communications. In the below, described is a process to be executed when a writing request is issued in the master IF section 500 or 600 to the memory 710 of the cache memory section 700. In the below, although the write-through mode is exemplarily applied, the write-back mode is surely applicable.

First, after conversion of a writing request for the cache memory section 700 and the writing data into the packet 10, the master MPU 520 or 620 of the master IF section 500 or 600 transmits the result to the path switch section 800 via the inner path 900 or 901 (S800). Responding to the writing request received from the master IF section 500 or 600, the path switch control section 810 of the path switch section 800 analyzes the communications attribute of "node information " included in the writing request to determine that the communications is cache memory communications (S801). The path switch control section 810 also analyzes the communications attribute of "first access/no access information" in the received writing request to determine whether or not to make access to the memory 820 of the path switch section 800 (S802).

Here, if determined as making access to the memory 820 (S802: YES), the path switch control section 810 writes, into the memory 820, the writing data received from the master IF section 500 or 600 together with the writing request (S803). Then, the path switch control section 810 transmits thus received writing request and writing data to the cache memory section 700 via the internal bus 902 (S804). Here, even if determined as making no access to the memory 820 (S802; NO), the path switch control section 810 transmits thus received writing request and writing data to the cache memory section 700 via the internal bus 902 (S904).

The memory control section 720 of the cache memory section 700 analyzes the communications attribute of "second access/no access information" included in the writing request received from the path switch section 800 to determine whether or not to make access to the memory 721 of the memory control section 720 (S905). Here, if determined as making access to the memory 721 (S905: YES), the memory control section 720 writes, into the memory 820, the writing data received together with the writing request from the path switch section 800 (S906). Into the memory 710, the same writing data is also written (S907).

If determined as making no access to the memory 820 (S905: NO), the memory control section 720 writes the writing data only to the memory 710 (S907).

Responding to completion of the writing process, the memory control section 720 returns "writing completion notice" to the master IF section 500 or 600 via the path switch section 800 and the internal bus 900 or 901 (S908). This notice notifies the master IF section 500 or 600 that the writing request is completely through (S809).

As such, this allows flexible arrangement of the writing data in at least any one of the memory (820, 721, and 710) for the master IF section 500 or 600 via the path switch control section 810 of the path switch section 800 and the memory control section 720 of the cache memory section 700. Such a writing process mechanism places the writing data to any one appropriate memory (820, 721, or 710) depending on the data details, e.g., reference frequency, update frequency, data size. For example, the "data" higher in reference frequency from the master IF section 500 or 600 may be placed in the memory 820 of the path switch section 800. Accordingly, the cache hit ratio can be increased throughout the storage device control unit 100, further leading to the better usage efficiency of the internal buses 900 to 903, and the better throughput of the storage device control unit 100 in its entirety.

<<Priority Process>>

Figure 9:
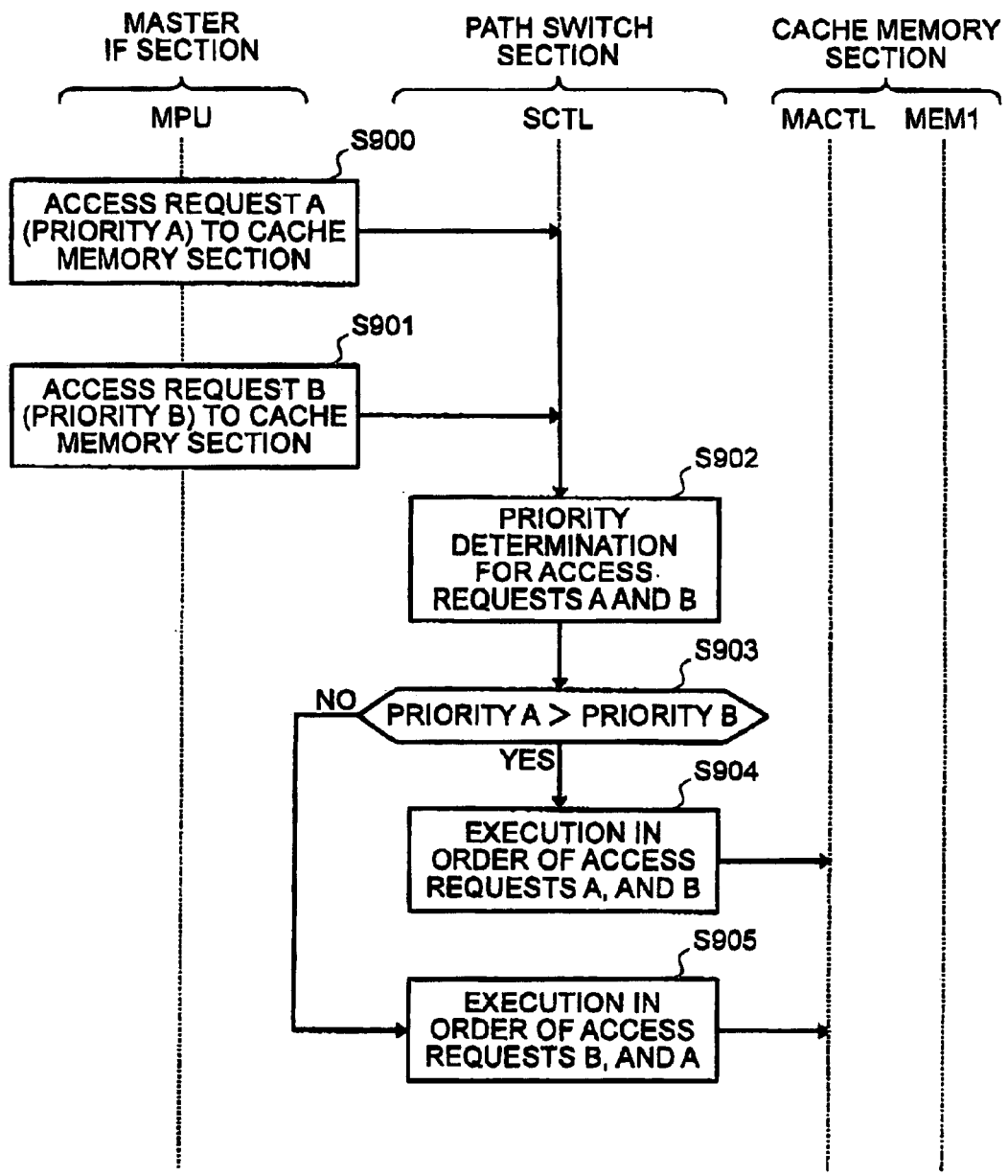
FIG. 9 is a flowchart illustrating a priority process in a path switch control section of the present embodiment.

FIG. 9.is a flowchart illustrating a priority process in the pass switch control section 810.

First, as to an access request A to the cache memory section 700, the master IF section 500 or 600 creates the packet 10 in which the communications attribute of "priority information" shows "priority A", and the resulting packet is forwarded to the path switch section 800 (S900). Similarly, as to another access request B to the cache memory section 700, created for transmission to the path switch section 800 is the packet 10 in which the communications attribute of "priority information" shows "priority B" (S901).

The path switch control section 801 of the path switch section 800 determines which of the access requests A and B received from the master IF section 500 or 600 has a higher priority (S902). If the priority A of the access request A is higher than the priority B of the access request B (S903: YES), the access request A is subjected to the process prior to the access request B (S904). On the other hand, if the priority B of the access request B is higher than the priority A of the access request A (S903: NO), the access request B is subjected to the process prior to the access request A (S905).

As such described above is the summary of the priority process executed by the path switch control section 810 responding to a plurality of access requests received from the master IF section 500 or 600. In the present invention, utilizing such a mechanism, the process for the "control data" may be so set as to be higher in priority than the process for the "data", for example. With such setting, the "data" process on a "sector (512 Bytes)" basis takes precedence over the "control data" process on the basis of about "4 to 6 Bytes", whereby the internal buses 900 to 903 will not be occupied that long with one "data process". That is, the process of "control data" does not have to wait long.

<Specific MPU Communications>

Figure 10:
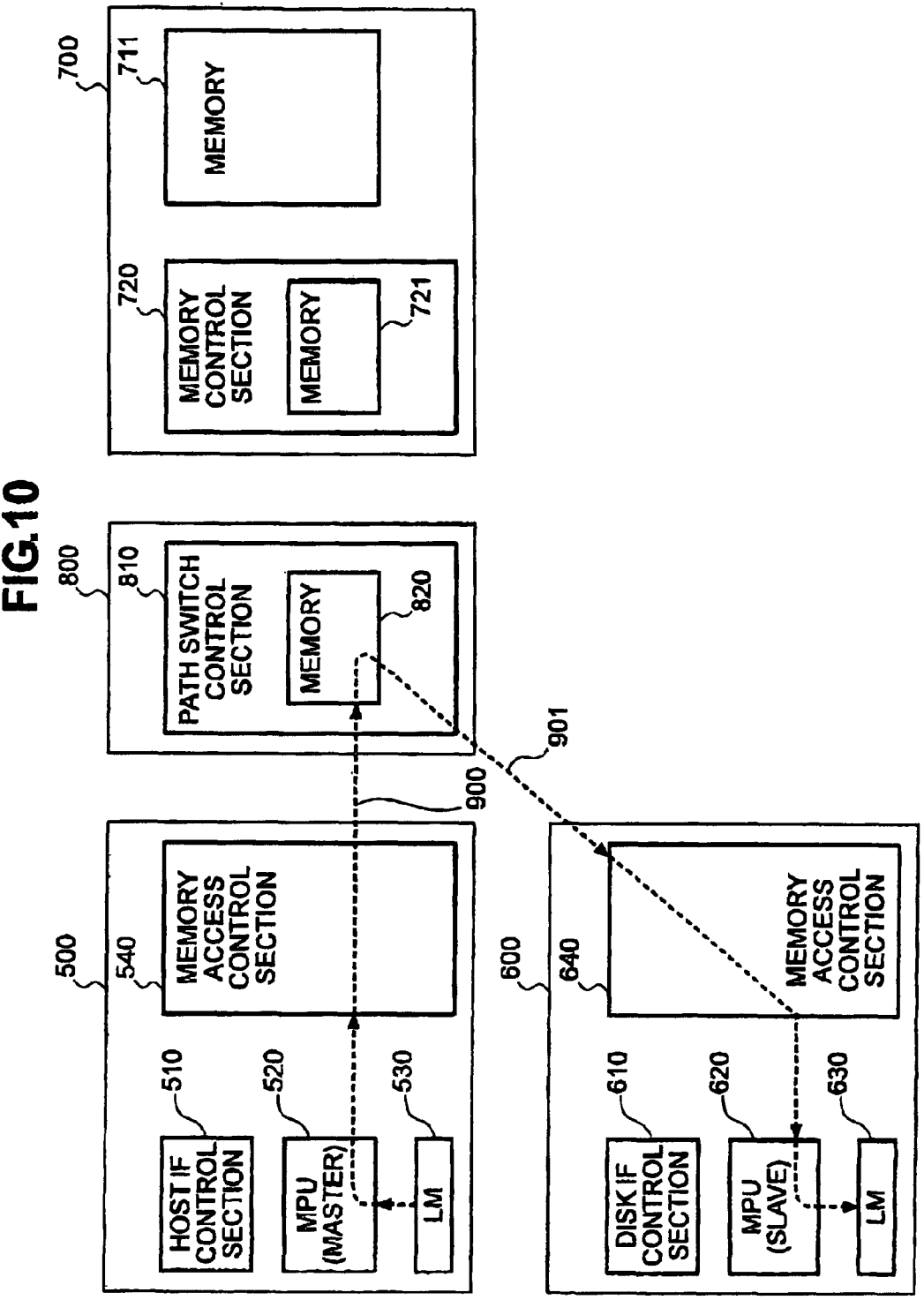
FIG. 10 is a diagram showing how access will be given at the time of specific MPU communications of the present embodiment.

The specific MPU communications is carried out specifically between the master MPU 520 or 620 and the MPU 520 or 620 being a slave (hereinafter, referred to as slave MPU). Considered here is an exemplary case where the MPU 520 (master MPU) of the host IF section 500 makes a request specifically to the MPU 620 (slave MPU) of the specific disk IF section 600 for a writing/reading process to/from the storage device 300, or a response is made from the MPU 620 (slave MPU) of the disk IF section 600 to the MPU 520 (master MPU) of the host IF section 500. FIG. 10 is a diagram showing how access will be given at this time.

Figure 11:
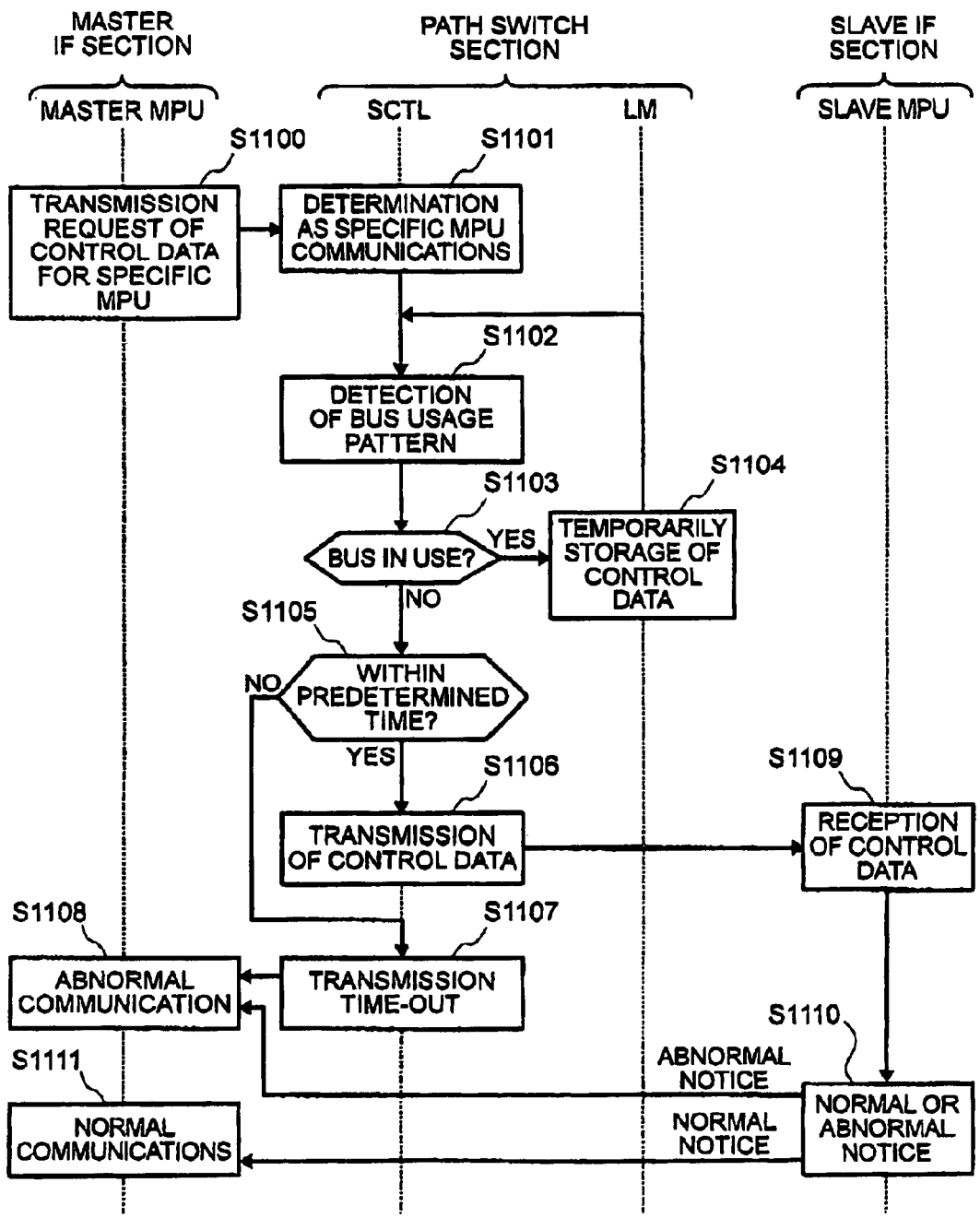
FIG. 11 is a flowchart illustrating the operation of the storage device control unit at the time of specific MPU communications of the present embodiment.

Using the flowchart of FIG. 11, described is the operation of the storage device control unit 100 at the time of specific MPU communications.

First, after conversion, into the packet 10, of the transmission request of the "control data" to the slave MPU 520 or 620 and the "control data", the master MPU 520 or 620 accordingly transmits the conversion result to the path switch section 800 via the inner path 900 or 901 (S1100). Here, the communications attribute ("node information") of the packet 10 is set to "specific MPU communications". Thus, the path switch control section 810 of the path switch section 800 analyzes the communications attribute of "node information" included in the request received from the master MPU 520 or 620 to see that the communications is specific MPU communications (S1101).

The path switch control section 801 detects the usage pattern of the internal bus 900 or 901 with appropriate timing (S1102). If the detection result tells that the internal bus 900 or 901 corresponding to the received request is already in use (S1103: YES), the path switch control section 810 temporarily stores in the memory 820 the "control data" received together with the request (S1104). When the internal bus 900 or 901 so far in use (S1103: YES) becomes vacant (S1103: NO), the path switch control section 810 reads the "control data" that has been temporarily stored in the memory 820 to resume the process of S1105 and onwards.

The memory 820 of the path switch section 800 functions as both a buffer and cache memory with respect to the memory 710 and 721. With such a buffer function, if the internal bus 900 or 901 between the path switch section 800 and the MPU 520 or 620 being the addressee, the master MPU 520 or 620 has no more need to transmit again the "control data" and others to the path switch section 800. Accordingly, this reduces the load imposed on the master MPU 520 or 620, leading to the less traffic on the internal bus 900 or 901.

Next, if the internal bus 900 or 901 corresponding to the received request is vacant (S1103: NO), the path switch control section 810 determines whether a predetermined time has lapsed between request reception and execution (S1105). If the predetermined time has not yet lapsed (S1105: YES), the path switch control section 810 transmits the "control data" received together with the request to the slave MPU 520 or 620 via the internal bus.900 or 901 (S1106).

Then, the slave MPU 520 or 620 goes through a predetermined process such as checking any data error in the "control data" received from the path switch section 800 via the internal bus 902, and performing writing into the local memory 530 or 630. If the "control data" has no data error and if the predetermined process has been normally executed, the slave MPU 520 or 620 transmits a "normal notice" to the master MPU 520 or 620 via the path switch section 800 (S1110). Here, if the "control data" has some data error or if the predetermined process has not been normally executed, transmitted to the master MPU 520 or 620 via the path switch section 800 is an "abnormal notice" (S1110).

If the predetermined time has already lapsed (S1105: NO), the path switch control section 810 forwards a "transmission time-out notice" back to the master MPU 520 or 620 (S1107). Through reception of the "transmission time-out notices or" the "abnormal notices" from the slave MPU 520 or 620, the master MPU 520 or 620 acknowledges that the current communications is not going right (S1108). The "normal notices" from the slave MPU 520 or 620 tells the master MPU 520 or 620 that the current communications is going right (S1111).

<Entire MPU Communications>

Figure 12:
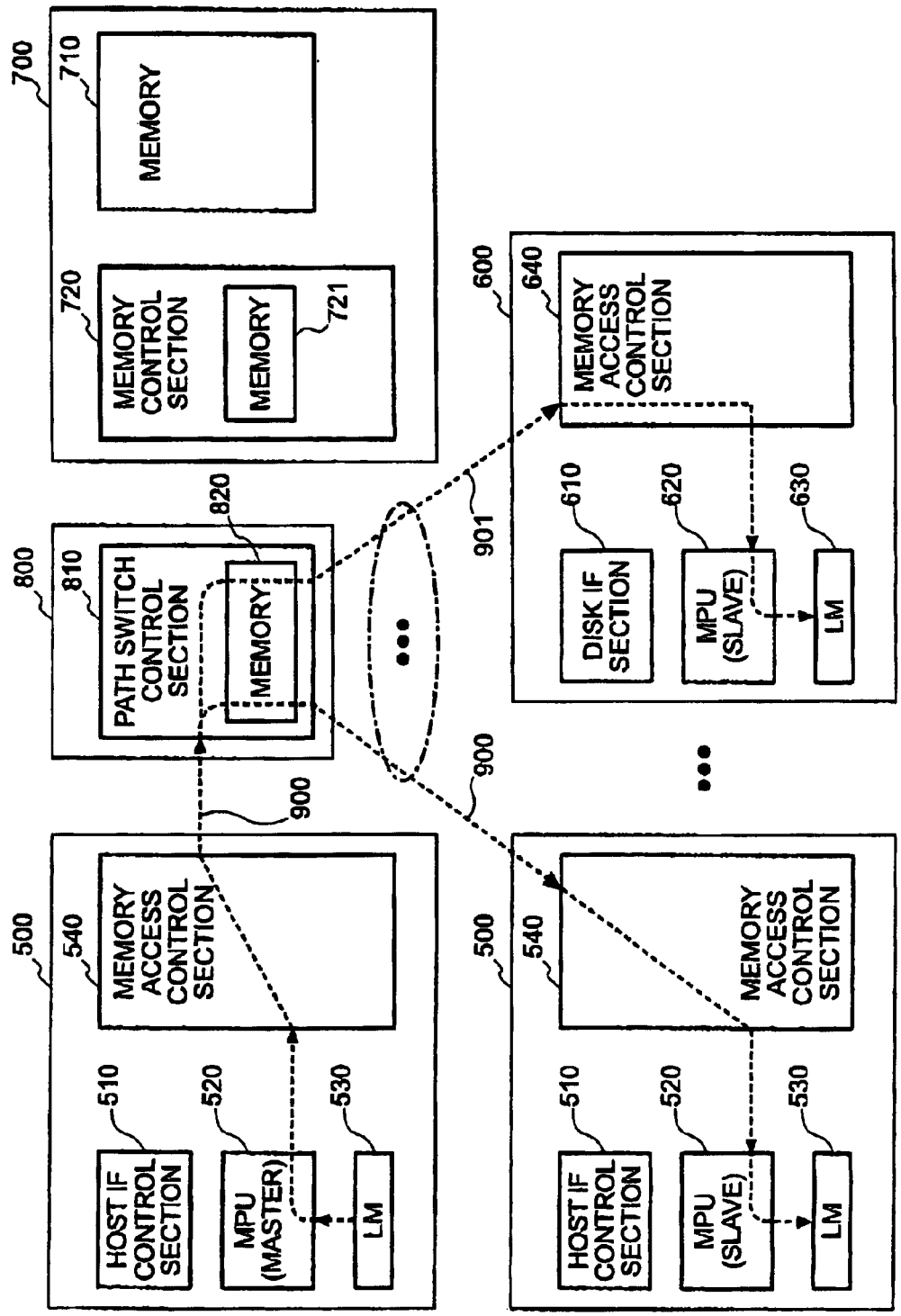
FIG. 12 is a flowchart illustrating the operation of the storage device control unit of the present embodiment responding to a reading request coming from a host computer.

The entire MPU communications is carried out between the master MPU 520 or 620 and every slave MPU 520 or 620 being not the master MPU 520 or 620. For example, for process synchronization in every MPU 520 or 620, the master IF section 500 or 600 transmits the "control data" to every slave MPU 520 or 620. Herein, the "control data" is including "unit structure information" and "failure information", both of which are those detected by the master IF section 500 or 600. FIG. 12 is a diagram showing how access will be given at this time.

Figure 13:
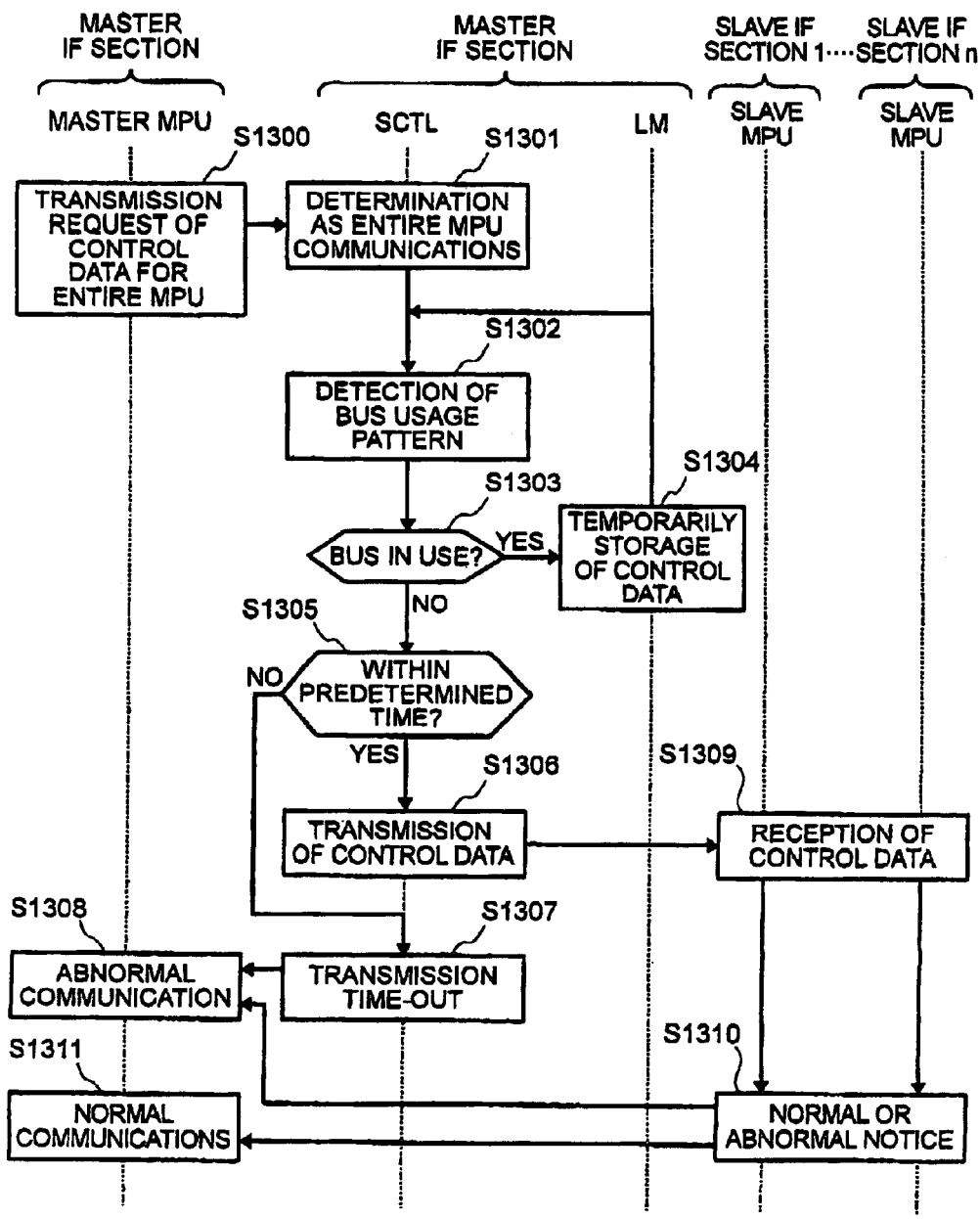
FIG. 13 is a flowchart illustrating the operation of the storage device control unit of the present embodiment responding to a writing request coming from the host computer.
Figure 14:
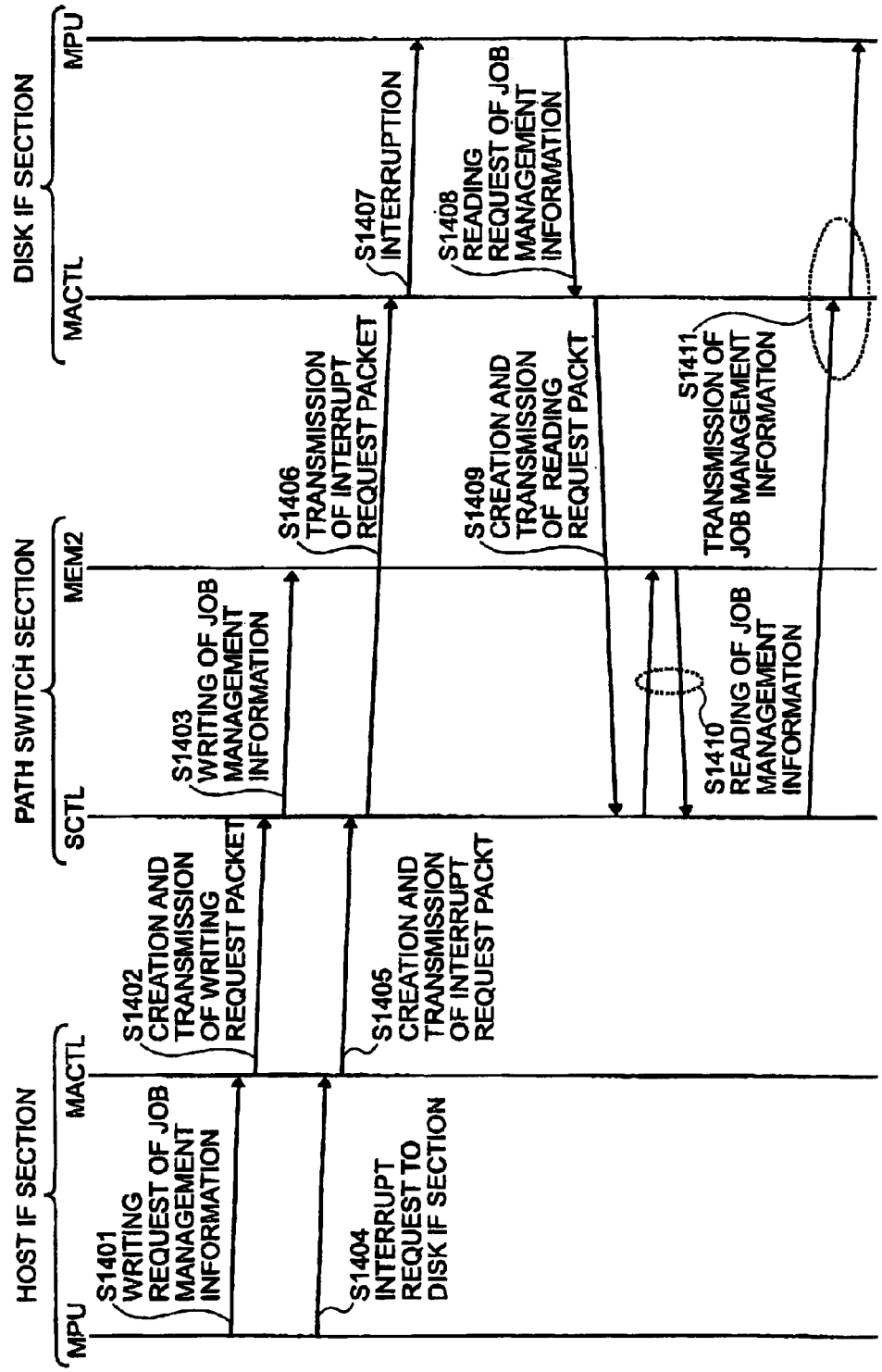
FIG. 14 is a diagram how access will be given at the time of entire MPU communications of the present embodiment.
Figure 15:
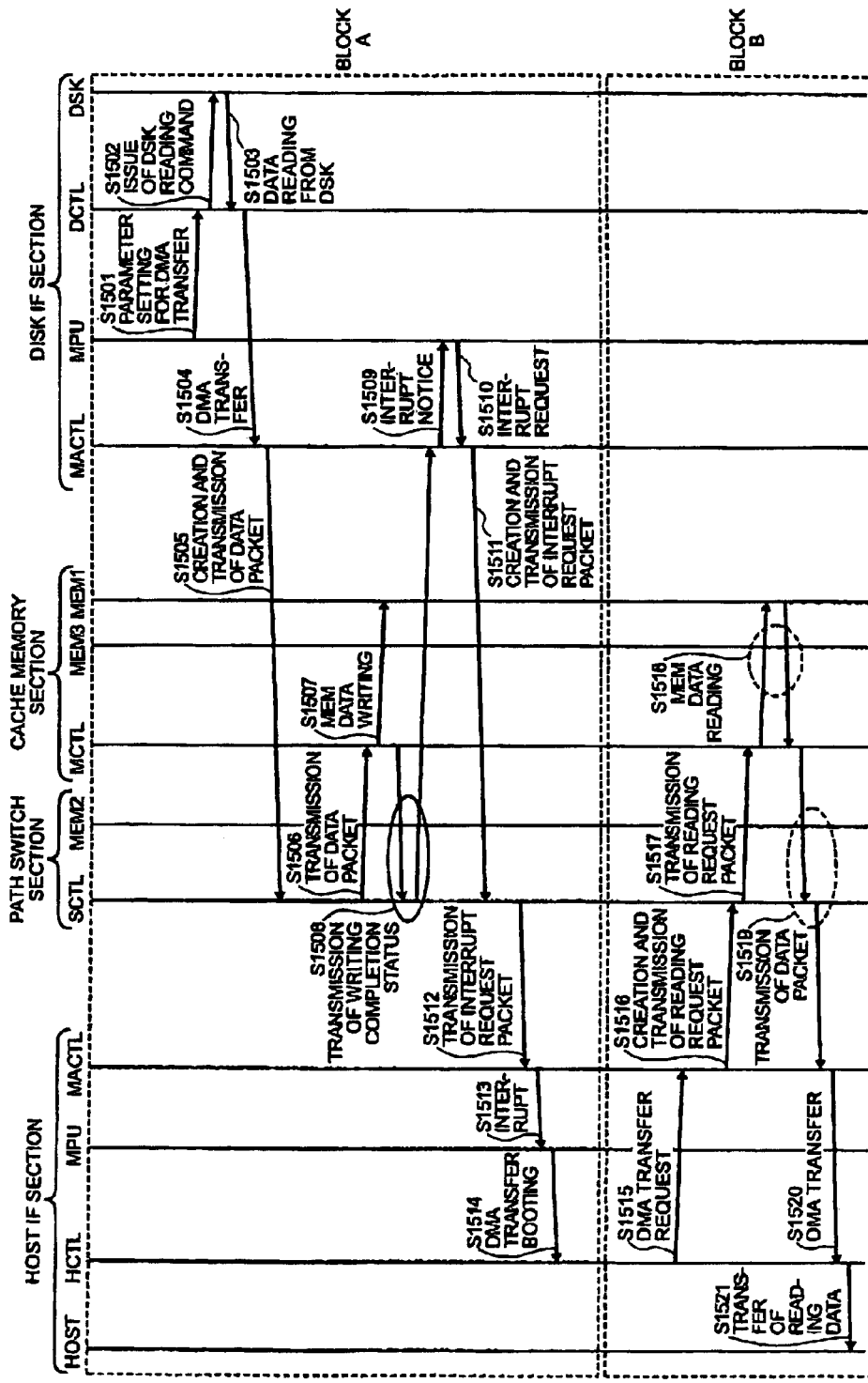
FIG. 15 is a flowchart illustrating the operation of the storage device control unit at the time of entire MPU communications of the present embodiment.

By referring to the flowchart of. FIG. 13, described now is the operation of the storage device control unit 100 at the time of entire MPU communications.

First, when the packet 10 is created in the memory access control section 540 or 640 of the master IF section 500 or 600, the communications attribute of "node information" of the packet 10 is set to "entire MPU communications". As a result, the path switch control section 810 of the path switch section 800 analyzes the communications attribute of "node information " included in the request received from the master MPU 520 or 620 (S1300) to see that the communications is entire MPU communications (S1301).

The path switch control section 810 detects the usage pattern of the internal buses 900 and 901 (S1302). If the detection result tells that the internal buses 900 and 901 are already in use (S1302: YES), the "control data" received together with the request is temporarily stored in the memory 820 (S1304). When the internal bus 900 or 901 becomes vacant (S1303: NO), the path switch control section 810 reads the "control data" having been temporarily stored in the memory 820 to resume the process of S1350 and onwards.

If the internal buses 900 and 901 are both vacant (S1303: NO), and if the predetermined time has not yet lapsed until the request is carried out (S1305: YES), the path switch control section 810 performs parallel transmission all at once for effective transfer of the "control data" received together with every request to the slave MPU 520 or 620 via the internal bus 900 or 901 (S1306). On the other hand, if the predetermined time has lapsed (S1305: NO), the path switch control section 810 forwards a "transmission time-out notice" back to the master MPU 520 or 620 (S1307).

Herein, the processes (S1309 and S1310) in the slave MPU 520 or 620 after reception of the "control data" from the path switch section 800 are the same as those (S1109 and S1110) in the specific MPU communications. That is, through reception of the "transmission time-out notice" or the "abnormal notice" from the slave MPU 520 or 620, the master MPU 520 or 620 acknowledges that the current communications is not going right (S1308). The "normal notice" from the slave MPU 520 or 620 tells the master MPU 520 or 620 that the current communications is going right (S1311).

Operation of Storage Device Control Unit (Specific Example):

Described below is the specific operation of the storage device control unit 100 including at least one of cache memory communications, specific MPU communications, and entire MPU communications handled by the path switch section 800 with some exemplary cases.

<Response to Reading Request from Host (Cache Memory Communications +Specific MPU Communications)>

Described below is a specific example including both cache memory communications and specific MPU communications. In a case where the cache memory section 700 and others store no "data" corresponding to a reading request from the host IF section 500, i.e., when cache miss is occurring, described is the process of returning the data read from the storage device 300 to the host computer 200 through the process executed by the host IF section 500 (MPU 520) and the disk IF section 600 (MPU 620) in a cooperative manner.

This cooperative process can be classified into three processes: a process of receiving and forwarding JOB management information ("control data") for making the host IF section 500 and the disk IF section 600 operate cooperatively; a process of notifying the host IF section 500 that writing to the cache memory section 700 is completed after the disk IF section 600 reads the "data" from the storage device 300; and after the host IF section 500 receives the notice, a process of reading the "data" thus written into the cache memory section 700 for transfer to the host computer 200.

First, by referring to the flowchart of FIG. 12, described is the process of receiving and forwarding the JOB management information between the host IF section 500 and the disk IF section 600. Assuming here is that, through reception of the reading request for the storage device 300 from the host computer 200, the host IF section 500 acknowledges a cache miss by reading cache directory information from the memory 710 (control data storage region 712) of the cache memory section 700.

After reading out the JOB management information from the local memory 530, the MPU 520 of the host IF section 500 issues a request for writing the JOB management information to the memory 820 of the path switch section 800 (S1201). Here, the JOB management information is parameter information used both by the host IF section 500 and the disk IF section 600 in the cooperative process therebetween such as "disk address information" at the time of accessing the storage device 300, "memory address information" at the time of accessing the memory 710 of the cache memory section 700, and the data size at the respective accesses.

After receiving the writing request, the memory access control section 540 of the host IF section 500 creates the packet 10 for each of the writing request and the JOB management information. Then, the results are forwarded to the path switch section 800 via the internal bus 900 (S1202). Here, the communications attribute of "first access/no access information" of the resulting packets 10 is so set as to access the memory 820 of the path switch section 800. Therefore, the path switch control section 810 of the path switch section 800 accordingly writes the JOB management information received from the memory access control section 540 into the memory 820 (S1203).

On the other hand, the MPU 520 of the host IF section 500 issues an interrupt request to any specific disk IF section 600 for receiving and forwarding the JOB management information therefrom/thereto (S1204). Responding to the interrupt request, the memory access control section 540 of the host IF section 500 creates the packet 10 for the interrupt request for transmission to the path switch section 800 via the internal bus 900 (S1205). Here, the communications attribute of "node information " of thus created packet 10 is set to "specific MPU communications". That is, through reception of the interrupt request from the memory access control section 540, the path switch control section 810 of the path switch section 800 understands that it is the specific MPU communications. Thereafter, the interrupt request is forwarded to the disk IF section 600 via the internal bus 901 (S1206).

The memory access control section 640 of the disk IF section 600 generates an interrupt to the MPU 620 when receiving the interrupt request from the path switch section 800 (S1207). As a result, the MPU 620 understands that the host IF section 500 has issued a receiving/forwarding request of the JOB management information. Then, the MPU 620 issues a request for reading the JOB management information stored in the memory 820 of the path switch section 800 (S1208).

After receiving the reading request, the memory access control section 640 of the disk IF section 600 creates the packet 10 for the reading request for transmission to the path switch section 800 via the internal bus 902 (S1209). The path switch control section 810 of the bus switch section 800 reads the JOB management information stored in the memory 820 (S1210), and returns the information back to the path switch section 800 via the internal bus 902 (S1211).

This is the end of the receiving and forwarding of the JOB management information between the host IF section 500 and the disk IF section 600. Referring to the flowchart (in block A) of FIG. 13, described is a notification process, in which after receiving and forwarding the JOB management information, the disk IF section 600 reads the "data" from the storage device 300, and notifies the host IF section 500 that the "data" is now stored in the cache memory section 700.

First, the MPU 620 of the disk IF section 600 sets the disk IF control section 610 with a parameter for DMA transfer based on the JOB management information, and issues a boot request for DMA transfer (S1501). After receiving the request, the disk IF control section 610 issues a request to the storage device 300 for reading the "data" (S1502), and then from the storage device 300, reads the "data" corresponding to the reading request (S1503).

The "data" thus read from the storage device 300 is subjected to DMA transfer to the memory access control section 640 (S1504).

Then, the memory access control section 640 creates the packet 10 for the writing request and the writing data for writing the DMA-transferred "data" to the memory 710 (data storage region 711) of the cache memory section 700. The result is then forwarded to the path switch section 800 via the internal bus 901 (S1505). In the communications attributes of the resulting packet 10, the "node information" is set to "cache memory communications", and the "first access/no access information" and the "second access/no access information" are both set to be "no access".

The path switch control section 810 of the path switch section 800 determines that the "data" of the packet 10 received from the memory access control section 640 is the cache memory communications, and transmits the packet 10 to the cache memory section 700 via the internal bus 902 (S1506). As a result, the memory control section 720 of the cache memory section 700 extracts the "data" from the packet 10 received from the path switch section 800. Thus extracted "data" is written into the memory 710 (data storage region 711) (S1507). After completion of such writing, a writing completion notice is forwarded to the disk IF section 600 via the internal bus 902, the path switch section 800, and the internal bus 901 (S1508).

Responding to the writing completion notice from the cache memory section 700, the memory access control section 640 of the disk IF section 600 generates an interrupt to the MPU 620 (S1509). As such, the MPU 620 determines that the "data" writing to the memory 710 of the cache memory section 700 is now through. The MPU 620 then issues an interrupt request for the host IF section 500 to read the "data" stored in the memory 710 (S1510).

After receiving the interrupt request, the memory access control section 640 of the disk IF section 600 creates the packet 10 for the interrupt request, and forwards the result to the path switch section 800 via the internal bus 902 (S1511). Of the resulting packet 10, the communications attribute of "node information "is set to " specific MPU communications".

In response to the interrupt request received from the memory access control section 640, the path switch control section 810 of the path switch section 800 determines that the communications is the specific MPU communications, and the request is forwarded to the host IF section 500 via the internal bus 900 (S1512). Then, the memory access control section 540 of the host IF section 500 generates an interrupt to the MPU 520 when receiving the interrupt request from the disk IF section 600 (S1513). In such a manner, the MPU 520 issues a request for the host IF control section 510 to boot DMA transfer (S1514).

By referring to the flowchart of FIG. 13 (in block B), described next is a transfer process applicable only to the cache memory communications. That is, after receiving the notice, the host IF section 500 reads the "data" written in the cache memory section 700 (data storage region 711) for transfer to the host computer 200.

After receiving the boot request for DMA transfer, the host IF control section 510 of the host IF section 500 issues a request for reading the "data" written in the cache memory section 700 (S1515). Responding to the reading request, the memory access control section 540 creates the packet 10 for the reading request for transmission to the path switch section 800 via the internal bus 900 (S1516). In the communications attributes of the packet 10, the "node information" is set to "cache memory communications", and the "first access/no access information" and the "second access/ no access information" are both set to be "no access".

The path switch control section 810 of the path switch section 800 determines that the reading request received from the memory access control section 540 is the cache memory communications, and transmits the request to the cache memory section 700 via the internal bus 902 (S1517). After receiving the reading request from the path switch section 800, the memory control section 720 of the cache memory section 700 reads the "data" written into the memory 710 (data storage region 711)(S1518). After converting thus read"data" into the packet 10, the result is forwarded to the host IF section 500 via the inner bus 902, the path switch section 800, and the inner bus 900 (S1519).

The memory access control section 540 of the host IF section 500 subjects the "data" received from the cache memory section 700 to DMA transfer to the host IF control section 510 (S1520). Then, the host IF control section 510 applies a protocol conversion process to the DMA-transferred "data" corresponding to the communications protocol with the host computer 200. Then, responding to the request coming from the host computer 200, the "data" having been subjected to protocol conversion is returned (S1521).

<Microprogram Update Process (Cache Memory Communications)>

Figure 16:
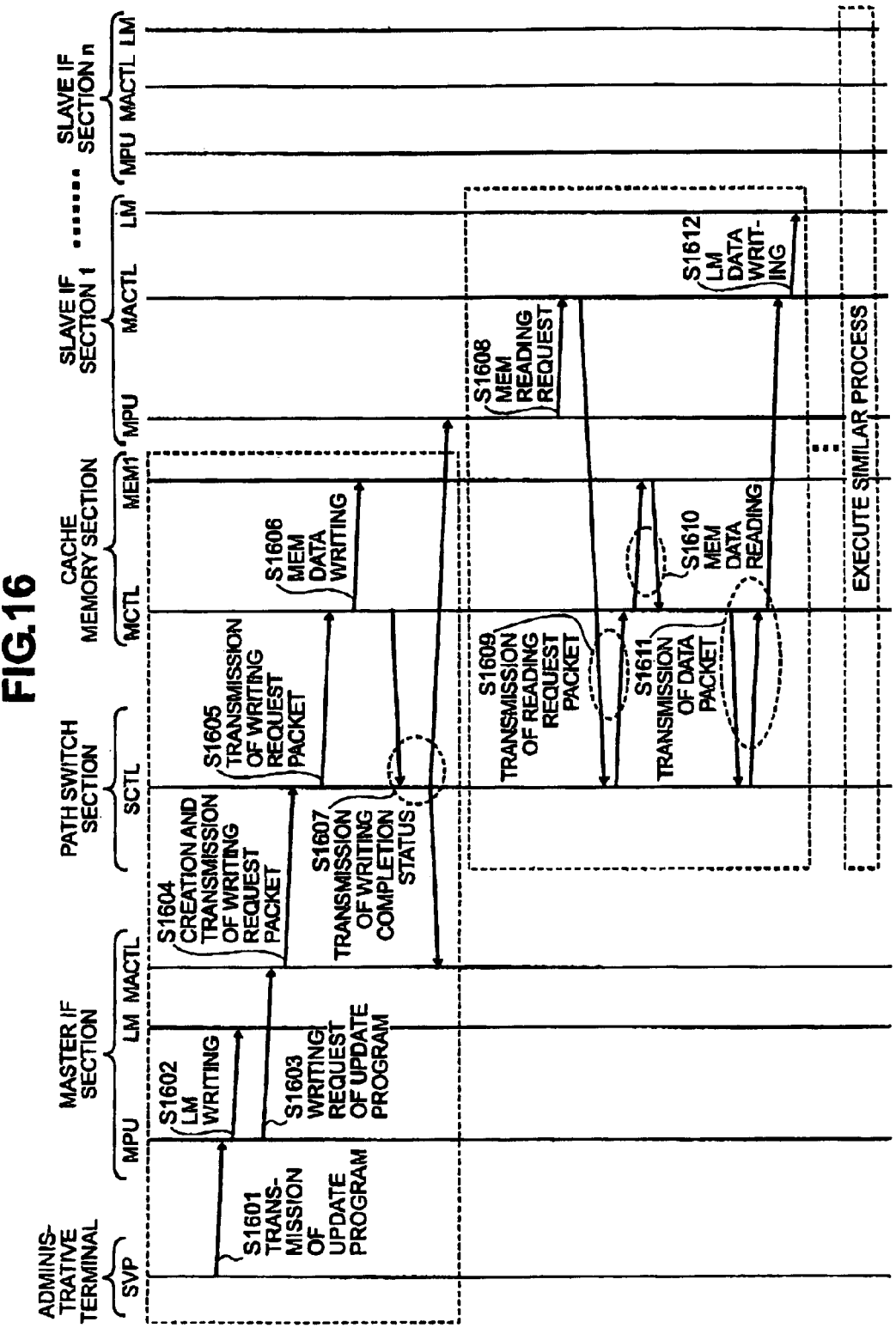
FIG. 16 is a flowchart illustrating the operation of the storage device control unit of the present embodiment responding to a program update request coming from an administrative terminal.

By referring to the flowchart of FIG. 16, described below are specific examples including the cache memory communications. In detail, described are a process of writing, into the memory 710 (control data storage region 712) of the cache memory section 700, an update microprogram ("control data") received by the master IF section 500 from the administrative terminal (SVP) 400 over the communications network, and a process of reading the update microprogram written into the cache memory section 700 (control data storage region 712) by the slave IF section 500 or 600.

First, the master IF section (host IF section) 500 has been received the update microprogram from the administrative terminal 400 over such a communications network as LAN (Local Area Network) (S1601), and writes the update microprogram into the local memory 530 (S1602). Further, the master MPU 520 of the master IF section 500 issues a request for writing the update microprogram to the memory 710 (control data storage region 712) of the cache memory section 700 (S1603).

The memory access control section 540 of the master IF section 500 creates the packet 10 each for the writing request and the update microprogram for transmission to the path switch section 800 via the internal bus 900 (S1604). In the communications attributes of the resulting packet 10, the "node information" is set to "cache memory communications", and the "first access/no access information" and the "second access/no access information" are both set to "no access". From the packet 10 received from the memory access control section 540, the path switch control section 810 of the path switch section 800 determines that it is the cache memory communications, and the packet is then forwarded to the cache memory section 700 via the internal bus 902 (S1605).

The memory control section 720 of the cache memory section 700 extracts the update microprogram from the packet 10 received from the path switch section 800. Thus extracted program is written into the control data storage region 712 of the memory 710 (S1606). After completion of such writing, the memory control section 720 forwards a "writing completion notice" back to the master IF section 500 via the path switch section 800, and also to the slave IF section 500 or 600 (S1607).

Responding to the "writing completion notice" from the path switch section 800, the slave IF section 500 or 600 determines that the microprogram so far stored in the memory 710 (control data storage region 712) of the cache memory section 700 is now updated. The MPU 520 or 620 of the slave IF section 500 or 600 then issues a request for reading the update microprogram from the memory 710 (control data storage region 712) of the cache memory section 700 (S1608).

After creating the packet 10 corresponding to the reading request, the memory access control section 540 or 640 of the slave IF section 500 or 600 forwards the packet 10 to the cache memory section 700 via the path switch section 800 (S1609). Of the resulting packet 10, the communications attribute of "node information" is set to "cache memory communications".

The memory control section 720 of the cache memory control 700 reads the update microprogram from the memory 710 (control data storage region 712) responding to the reading request received from the path switch section 800 (S1610). Then, after converting the update microprogram into the packet 10, the result is returned back to another slave IF section 500 or 600 via the path switch section 800 (S1611). This allows the slave IF section 500 or 600 to receive the update microprogram from the cache memory section 700 for writing into the local memory 530 or 630 (S1612).

<Structural Information Update Process (Entire MPU Communications)>

Figure 17:
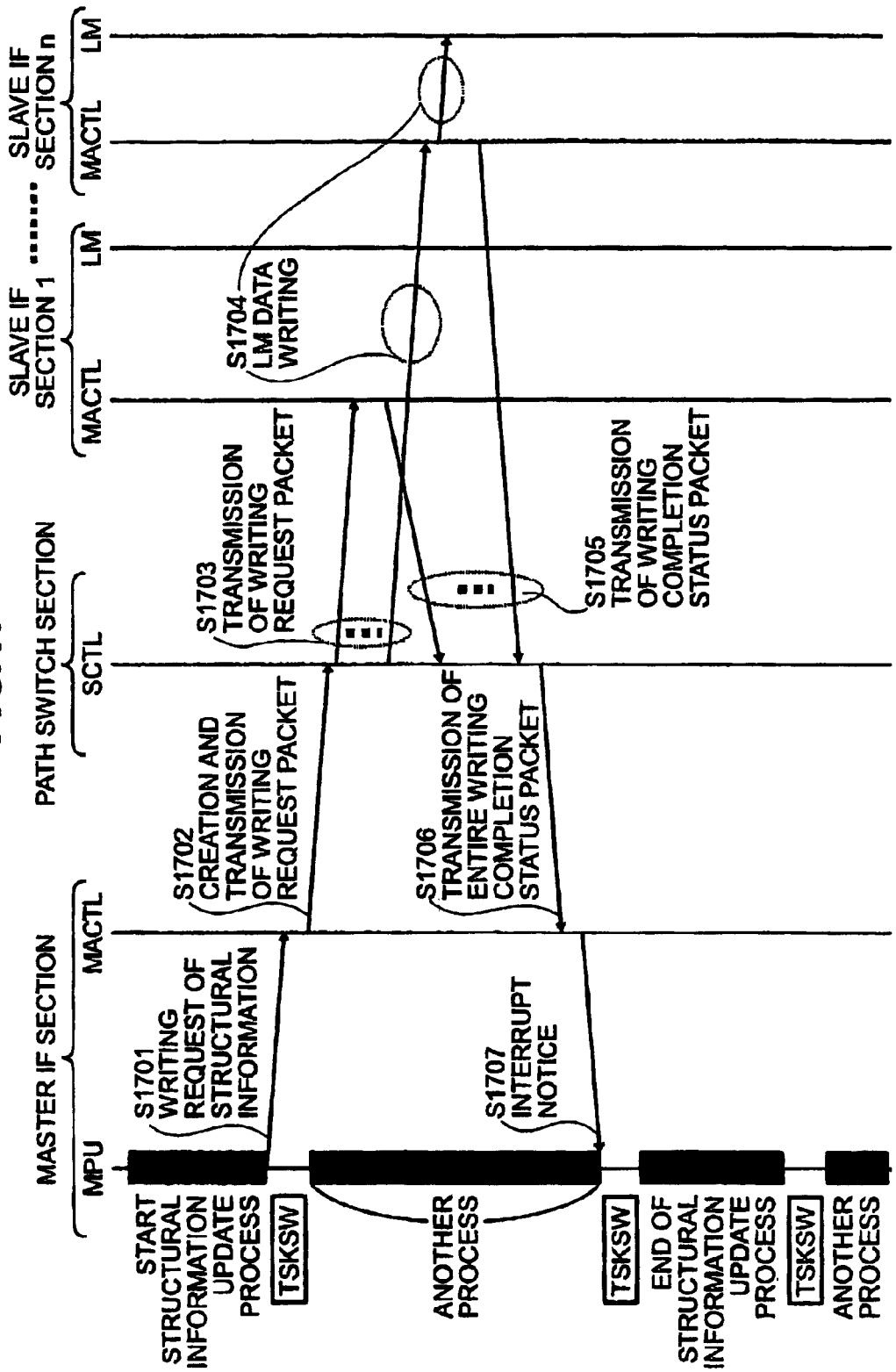
FIG. 17 is a flowchart illustrating a structural information update process in the storage device control unit of the present embodiment.

As a specific example including the entire MPU communications, described is a process of the master IF section 500, that is transmitting structural information of the inner unit to every slave IF section 500 or 600 by referring to the flowchart of FIG. 17.

First, the master IF section 500 creates a task for a structural information update process through detection of structure change inside of the storage device control unit 100. Then, the master IF section 500 writes the updated structural information into a broadcasting address space, which is previously provided in the local memory 520. As such, the MPU 520 of the master IF section 500 issues a writing request for every slave IF section 500 and 600 to broadcast (transmit) the updated structural information (S1701). Then, the MPU 520 of the master IF section 500 temporarily stops the task of structural information update process, and switches it to a task of another process.

After creating the packet 10 each for the writing request and the updated structural information, the memory access control section 540 of the master IF section 500 transmits the packets 10 to the path switch section 800 via the internal bus 900 (S1702). In the communications attributes of the resulting packets 10, the "node information" is set to "entire MPU communications", and the "first access/no access information" and the "second access/no access information" are both set to be "no access". Thus, the path switch control section 810 of the path switch section 800 determines that the packets 10 received from the memory access control section 540 are the entire MPU communications, and performs broadcasting to every slave IF section 500 and 600 via the internal buses 900 and 901 (S1703).

The slave IF sections 500 and 600 receive the broadcast packets 10 via the path switch section 800, and writes the updated structural information to the local memory 530 or 630 (S1704). Then, when such writing of updated structural information is completed, a "writing completion notice" is forwarded back to the path switch section 800 (S1705).

The path switch control section 810 of the path switch section 800 waits for the "writing completion notice" from every slave IF section 500 and 600 before returning a "entire writing completion notice" to the master IF section 500 (S1706). Then, the memory access control section 540 of the master IF section 500 generates an interrupt to a task of another process currently executed by the MPU 520 of the master IF section 500 (S1707).

Responding to such an interrupt, the MPU 520 of the master IF section 500 resumes the task of the structural information update process, and determines that the task of the structural information update process is now through.

As such, the master IF section 500 transmits the updated structural information to every slave IF section 500 and 600. Herein, the process in which the master IF section 500 transmits the detected error information to every slave IF section 500 and 600 can be described as the similar process flow.

The embodiment described in the foregoing is provided for easy understanding of the present invention, and not for restrictive interpretation thereof. The present invention may be change and modified without departing from the scope thereof, are equivalently included in the present invention.

What is claimed is:

1. A storage device control unit for performing data writing/reading to/from a storage device responding to a request coming from an information processor via a network the unit comprising:

a communications interface section for carrying out communications with the information processor;

a storage device interface section for carrying out communications with the storage device;

a cache memory section including first cache memory for storage of data coming and going between the information processor and the storage device; and an internal connection section for connecting all together the communications interface section, the storage device interface section, and the cache memory section for communications thereamong, wherein the internal connection section is provided with second cache memory for storage of data same as the data stored in the first cache memory.

2. The storage device control unit according to claim 1, wherein the communications interface section and the storage device interface section each include an access control section for transmitting, to the connection section, first access/no access information for indicating whether or not to make access to the second cache memory together with an access request to the first cache memory, and the connection section includes a control section for controlling whether or not to make access to the second cache memory based on the first access/no access information included in the access request received from the access control section.

3. The storage device control unit according to claim 1, wherein the cache memory section includes:

a memory control section for controlling writing/reading of the data to/from the first cache memory; and third memory being accessible by the memory control section, and storing data same as the one stored in the first cache memory.

4. The storage device control unit according to claim 3, wherein the communications interface section and the storage device interface section each include an access control section for transmitting, to the connection section, second access/no access information for indicating whether or not to make access to the third memory together with an access request to the first cache memory, and the memory control section controls whether or not to make access to the third memory based on the second access/no access information included in the access request received from the access control section via the connection section.

5. The storage device control unit according to claim 1, wherein the communications interface section and the storage device interface section each include an access control section for transmitting, to the connection section, addressee information designating as an addressee all of the communications interface sections and all of the storage device interface sections, the communications interface section or the storage device interface section, or the memory section together with the data or control data for controlling transfer of the data, and the connection section includes a control section for controlling communications with the addressee designated by the addressee information received from the access control section together with the data or the control data.

6. The storage device control unit according to claim 5, wherein the control section of the connection section stores the received data or control data in the second cache memory until a data bus to be used for transferring the data or the control data becomes available.

7. The storage device control unit according to claim 5, wherein the control section of the connection section transmits, back to an addresser of the received data or control data, information indicating whether or not the received data or control data is transmitted to the addressee within a predetermined time.

8. The storage device control unit according to claim 5, wherein when the addressee information received together with the data or control data is designating all of the communications interface sections and all of the storage device interface sections as the addressee, the control section of the connection section performs parallel transmission of the received data or control data to the addressee.

9. The storage device control unit according to claim 1, wherein the communications interface section and the storage device interface section each include an access control section for transmitting, to the connection section, the data or control data for controlling transfer of the data together with priority information with which a priority is set in a transfer process to be executed in the connection section, and the connection section includes a control section for executing the transfer process based on the priority set in the priority information that is received from the access control section together with the data or the control data.

10. The storage device control unit according to claim 9, wherein in the priority information, the data or the control data having a first data size has a higher priority than the data or the control data having a second data size smaller than the first data size.

11. The storage device control unit according to claim 1, wherein the first cache memory stores the data coming and going between the information processor and the storage device, and the control data for controlling the data coming and going.

12. The storage device control unit according to claim 1, wherein connection among the communications interface section, the storage device interface section, and the connection section, and between the connection section and the cache memory section is established by a data bus that is used for transferring the data coming and going between the information processor and the storage device, and the control data for controlling the data coming and going.

13. The storage device control unit according to claim 1, wherein the connection section is a high-speed crossbar switch for establishing a network connection among the communications interface section, the storage device interface section, and the cache memory section.

14. The storage device control unit according to claim 1, wherein the communications interface section, the storage device interface section, the cache memory section, and the connection section are each a unit, and the storage device control unit includes an attachment section to which the unit is attachable.

15. A method for controlling communications between an information processor and a storage device via a network comprising:

providing a storage device control unit including a communications interface section for carrying out communications with an information processor, a storage device interface section for carrying out communications with a storage device, a cache memory section including first cache memory and an internal connection section for connecting all together the communications interface section, the storage device interface section, and the cache memory section for communications thereamong, and the connection section being provided with second cache memory;

storing data coming and going between the information processor and the storage device in the first cache memory; and storing in the second cache memory data same as the data stored in the first cache memory.

* * * * *